United States Patent
Knoblauch et al.

(10) Patent No.: US 9,598,891 B2
(45) Date of Patent: Mar. 21, 2017

(54) THERMAL BREAK FOR USE IN CONSTRUCTION

(71) Applicant: JK Worldwide Enterprises Inc., Surrey (CA)

(72) Inventors: Jeffrey S. Knoblauch, Langley (CA); Jared D. Krish, Langley (CA)

(73) Assignee: JK WORLDWIDE ENTERPRISES INC., Surrey, British Columbia (CA)

( * ) Notice: Subject to any disclaimer, the term of this patent is extended or adjusted under 35 U.S.C. 154(b) by 0 days.

(21) Appl. No.: 14/835,296

(22) Filed: Aug. 25, 2015

(65) Prior Publication Data

US 2016/0281413 A1  Sep. 29, 2016

Related U.S. Application Data

(60) Provisional application No. 62/136,887, filed on Mar. 23, 2015, provisional application No. 62/146,487, filed on Apr. 13, 2015.

(51) Int. Cl.
*E04B 2/02* (2006.01)
*E04C 1/40* (2006.01)
(Continued)

(52) U.S. Cl.
CPC .............. *E06B 1/02* (2013.01); *E04B 1/7608* (2013.01); *E04B 1/78* (2013.01); *E04B 1/80* (2013.01);
(Continued)

(58) Field of Classification Search
CPC .... E04B 1/4178; E04B 1/7616; E04B 1/4185; E04B 1/7637; E04B 1/7165; E04B 2001/7679; E04C 2/284
(Continued)

(56) References Cited

U.S. PATENT DOCUMENTS 2,800,743 A * 7/1957 Meehan ............... A63H 33/084
                                                    446/127
3,324,615 A * 6/1967 Zinn ..................... E04B 2/7409
                                                    52/241
(Continued)

FOREIGN PATENT DOCUMENTS

CA         1312441 C     1/1993
WO    WO 2016149822 A1 * 9/2016

OTHER PUBLICATIONS

Search Report and Written Opinion for PCT/CA2016/050335 dated Jun. 23, 2016 (8 pages).*

(Continued)

*Primary Examiner* — Rodney Mintz
(74) *Attorney, Agent, or Firm* — Greer, Burns & Crain, Ltd.; Steven P. Fallon

(57) ABSTRACT

The present disclosure relates to a thermal break for use in tilt-up construction. The thermal break generally comprises an elongate body comprising a thermal insulating material. The thermal break may further comprise one or more protrusions extending away from the elongate body. The present disclosure further relates to a method of constructing an exterior wall comprising the thermal break positioned between a fascia wythe and a structural wythe of the exterior wall. The exterior wall may be tilted up to a vertical position during construction of a building, and the thermal break provides a fixture-mounting surface onto which a fixture, for example a door frame, window frame, air venting grill, or other building component can be mounted.

32 Claims, 19 Drawing Sheets

(51) Int. Cl.
E06B 1/02 (2006.01)
E04B 1/76 (2006.01)
E04B 1/80 (2006.01)
E04C 2/288 (2006.01)
E04B 1/78 (2006.01)
B28B 7/08 (2006.01)
E04B 1/35 (2006.01)

(52) U.S. Cl.
CPC .............. *E04C 2/2885* (2013.01); *B28B 7/08* (2013.01); *E04B 1/355* (2013.01); *E04B 2001/7679* (2013.01); *E04B 2103/02* (2013.01)

(58) Field of Classification Search
USPC .......... 52/27, 309.12, 364, 782.1, 434, 435, 52/424–426, 404.1, 413, 309.11, 309.7, 52/410
See application file for complete search history.

(56) References Cited

U.S. PATENT DOCUMENTS

| | | | | |
|---|---|---|---|---|
| 3,530,632 A * | 9/1970 | Sloan | .................. | B28B 19/0053 52/425 |
| 3,618,279 A * | 11/1971 | Sease | .................. | E04B 2/46 52/223.7 |
| 3,768,225 A * | 10/1973 | Sloan | .................. | E04C 2/041 52/425 |
| 4,624,089 A | 11/1986 | Dunker | | |
| 5,230,195 A * | 7/1993 | Sease | .................. | E04B 2/18 52/309.9 |
| 5,493,816 A * | 2/1996 | Willemsen | .................. | A63H 33/04 446/104 |
| 5,661,874 A * | 9/1997 | Latour | .................. | A47G 27/0462 16/16 |
| 5,934,037 A * | 8/1999 | Bundra | .................. | E04B 2/08 52/126.4 |
| 6,050,873 A * | 4/2000 | Reisman | .................. | A63H 33/062 446/121 |
| 6,164,035 A * | 12/2000 | Roberts | .................. | E04B 1/14 52/220.2 |
| 6,662,518 B1 * | 12/2003 | Devereux | .................. | A47G 27/045 16/16 |
| 7,096,630 B1 * | 8/2006 | Keene | .................. | E04F 15/20 52/302.1 |
| 7,461,490 B2 * | 12/2008 | Toledo | .................. | E04B 2/14 52/293.2 |
| 7,938,379 B2 * | 5/2011 | Baten | .................. | F16M 5/00 248/674 |
| 8,176,697 B1 * | 5/2012 | Bolander, II | .................. | E04B 1/4157 52/309.12 |
| 8,382,398 B2 * | 2/2013 | Stauffacher | .................. | E02B 3/108 405/111 |
| 8,516,761 B2 * | 8/2013 | Laiho | .................. | E01C 11/14 404/59 |
| 8,844,227 B1 | 9/2014 | Ciuperca | | |
| 8,950,154 B1 * | 2/2015 | Casey | .................. | E02D 27/00 49/483.1 |
| 8,956,084 B2 * | 2/2015 | Kelly, Jr. | .................. | 405/262 |
| 9,089,096 B1 * | 7/2015 | Ulrich | .................. | A01G 1/08 |
| 2004/0088947 A1 * | 5/2004 | Villani | .................. | E04C 2/049 52/782.1 |
| 2006/0059824 A1 * | 3/2006 | Barbisch | .................. | E02D 29/025 52/503 |
| 2006/0283102 A1 * | 12/2006 | Sourlis | .................. | E04B 1/7061 52/62 |
| 2007/0193215 A1 * | 8/2007 | Jablonka | .................. | E04B 1/70 52/782.1 |
| 2008/0060291 A1 * | 3/2008 | Braun | .................. | E04C 5/165 52/223.2 |
| 2008/0127584 A1 * | 6/2008 | Schiffmann | .................. | B29C 70/443 52/293.3 |
| 2008/0245007 A1 * | 10/2008 | McDonald | .................. | E04C 2/246 52/309.5 |
| 2009/0094917 A1 * | 4/2009 | McIntosh | .................. | E02D 29/0241 52/311.1 |
| 2009/0158675 A1 * | 6/2009 | Sourlis | .................. | E04B 1/72 52/101 |
| 2009/0308008 A1 * | 12/2009 | Shockey | .................. | B29C 33/424 52/309.12 |
| 2010/0101168 A1 * | 4/2010 | Hohmann, Jr. | .................. | E04B 1/7046 52/513 |
| 2010/0107531 A1 * | 5/2010 | Hunsaker | .................. | E04F 13/147 52/314 |
| 2010/0311299 A1 * | 12/2010 | Rath | .................. | A63H 33/14 446/87 |
| 2011/0016817 A1 * | 1/2011 | Way | .................. | E04B 1/163 52/426 |
| 2011/0021107 A1 * | 1/2011 | Nag | .................. | A63H 33/042 446/91 |
| 2011/0258964 A1 * | 10/2011 | Wu | .................. | E04B 1/14 52/791.1 |
| 2011/0271624 A1 * | 11/2011 | Wilson | .................. | E04F 13/0864 52/309.4 |
| 2011/0289877 A1 * | 12/2011 | Correia | .................. | E04F 13/0851 52/309.4 |
| 2012/0023858 A1 * | 2/2012 | Lee | .................. | E04C 5/0645 52/636 |
| 2012/0055010 A1 * | 3/2012 | Milburn | .................. | E06B 3/66342 29/527.1 |
| 2012/0144765 A1 * | 6/2012 | LeBlang | .................. | E04B 2/58 52/220.2 |
| 2012/0240496 A1 * | 9/2012 | Gutzwiller | .................. | E04B 5/43 52/223.1 |
| 2012/0261053 A1 * | 10/2012 | O'Leary | .................. | B29C 44/185 156/79 |
| 2013/0312357 A1 * | 11/2013 | Lin | .................. | A63H 33/106 52/589.1 |
| 2014/0087158 A1 | 3/2014 | Ciuperca | | |
| 2014/0182221 A1 * | 7/2014 | Hicks | .................. | E02D 31/00 52/169.11 |
| 2016/0312459 A1 * | 10/2016 | Hochstuhl | .................. | E04B 1/41 |
| 2016/0312460 A1 * | 10/2016 | Hochstuhl | .................. | E04B 1/41 |

OTHER PUBLICATIONS

Building Science Corporation, "BSI-059: Slab Happy—Concrete Engineering", Apr. 15, 2012, 9 pages.
UK Thermal Solutions, "TigerLoc Installation Guide", Jan. 16, 2016, 7 pages.
Schoeck Isokorb, "Thermal Bridge Solutions Product Guide—North America", Jan. 2013, 12 pages.
Thermomass System NC, "Canopy Connection", Dec. 16, 2010, 1 page.
Thermomass System NC, "Canopy Connection—Slotted", Dec. 16, 2010, 1 page.

* cited by examiner

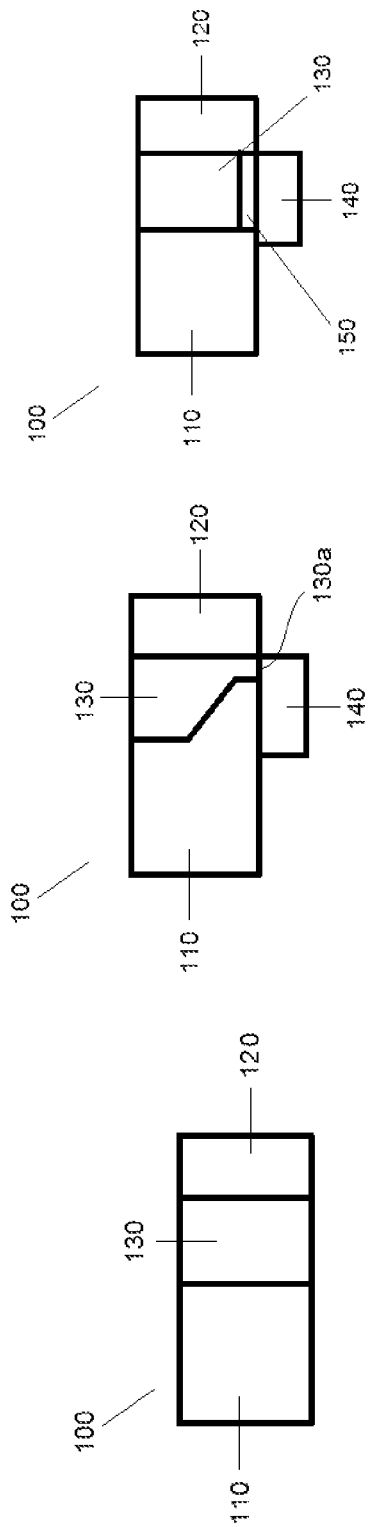

THERMAL BREAK FOR USE IN CONSTRUCTION

CROSS-REFERENCE TO RELATED APPLICATIONS

This present application claims priority to U.S. provisional application No. 62/136,887, filed Mar. 23, 2015, and U.S. provisional application No. 62/146,487, filed Apr. 13, 2015.

TECHNICAL FIELD

The present disclosure relates to a thermal break for use in construction, and more specifically a thermal break for use in tilt-up construction that provides a weight-bearing surface to which a fixture can be mounted. The present disclosure further relates to an exterior wall comprising the thermal break, and a method of constructing the exterior wall comprising the thermal break.

BACKGROUND

"Tilt-up" is a construction technique commonly used in constructing industrial-scale buildings such as warehouses. In tilt-up construction, an area of land is generally cleared of organic debris and other obstructions (e.g. boulders), and brought down to suitable elevation and grade. The land is checked to ensure that it is capable of supporting a building foundation. Footings lying around the perimeter of the area of land are poured. Wet concrete is then poured over the ground and allowed to set and form a concrete slab. The concrete slab forms the flooring of the building. To prevent surfaces bonding to the concrete slab, the concrete slab is sprayed with a chemically reactive bond breaker. Concrete elements such as walls (e.g. exterior walls) are then formed horizontally on top of the concrete slab by pouring wet concrete into a pre-defined area defined by a wood formwork. The wet concrete sets to form the concrete element. The wood formwork is removed, and the concrete element is then tilted to an upright position from a horizontal position and positioned at the perimeter of the concrete slab.

Exterior walls made for tilt-up construction generally comprise: (i) an exterior layer called a fascia wythe; (ii) an interior layer called a structural wythe; and (iii) insulating material therebetween. To form an exterior wall, welded wire mesh is laid within the pre-defined area defined by the wood formwork, and a first layer of wet concrete is poured over the welded wire mesh. This first layer of wet concrete sets and forms the fascia wythe. Before the first layer of wet concrete sets, insulating material is positioned over the first layer of wet concrete and coupled to the first layer of wet concrete by methods known in the art. The insulating material is generally a non-weight bearing insulating material (e.g. extruded polystyrene insulation). Once the first layer of wet concrete has set, reinforcing bars are laid out over the insulating material, and a second layer of wet concrete is poured over the reinforcing bars and insulating material. The second layer of wet concrete is coupled to the insulating material by methods known in the art and sets to form the structural wythe. A construction crane may then be used to manoeuvre the exterior wall to its desired upright location and position.

Previously, building energy codes pertaining to industrial buildings did not require an exterior wall to be insulated. As such, it was common practice to have only the structural wythe as the exterior wall (i.e. no insulating material and no fascia wythe), and to mount fixtures directly onto the structural wythe since the structural wythe was reinforced with reinforcing bar and therefore had the structural properties to provide a weight-bearing surface for fixtures. Fixtures include, but are not limited to, door frames, window frames venting grills or other building components. However, it is now common place for new industrial buildings, including "tilt-up" concrete buildings, to be required to meet certain energy efficiency standards. Under these new building energy codes, exterior walls must be insulated. As such, new building energy codes essentially require that a fascia wythe and a structural wythe of an exterior wall be separated by insulating material or a thermal break at all locations along the two layers of wythes. Such an exterior wall is exemplified in FIG. 1(a), which shows a structural wythe 110 and a fascia wythe 120 of an exterior wall 100 separated by insulating material 130.

Generally, a fixture (e.g. a door frame) is mounted onto the exterior wall such that the width of the fixture covers the insulating material that extends to the perimeter of the exterior wall, thereby also acting as a barrier that reduces the loss of thermal energy where the insulating material meets the perimeter of the exterior wall. However, the insulating material is not weight-bearing, and direct mounting of a fixture onto the insulating material may result in structural failure over time. One option is to modify the shape of the insulating material and the shape of the structural wythe such that only a narrow rib of insulating material extends towards the perimeter of the exterior wall. In this arrangement, and referring to FIG. 1(b), a fixture 140 may be mounted mainly to the structural wythe 110 while still covering surface 130a of the insulating material 130. However, because the fixture 140 still overlaps at least a portion of the non-weight-bearing insulating material 130 (i.e. over insulating material surface 130a), structural failure where the fixture overlaps with the non-weight-bearing insulating material may still occur over time.

Another option is to position a piece of wood 150 between insulating material 130 and the perimeter of the exterior wall as shown in FIG. 1(c). The wood 150 acts as a heat loss barrier and also provides a mounting and weight-bearing surface for fixture 140. However, wood and concrete expand and contract at different rates, and the combination may eventually lead to mechanical failure. In addition, moisture can access the wood, and can lead to wood rot over time.

SUMMARY

The present disclosure relates to a thermal break for use in construction, and more specifically a thermal break for use in tilt-up construction that provides a weight-bearing surface to which a fixture can be mounted. The present disclosure further relates to an exterior wall comprising the thermal break, and a method of constructing the exterior wall comprising the thermal break.

According to an aspect of the disclosure, there is a thermal break for providing a surface for mounting a fixture thereon. The thermal break comprises an elongate body. The elongate body comprises: (i) one or more thermal insulating materials; (ii) a fixture-mounting surface that is suitable for supporting a fixture; (iii) a surface opposite the fixture-mounting surface; (iv) a first contacting surface, at least a portion of which is suitable for contacting a fascia wythe; and (v) a second contacting surface opposite the first contacting surface, at least a portion of which is suitable for contacting a structural wythe. The first contacting surface and the second contacting surface extend between the fixture-mounting surface and the surface opposite the fixture-mounting surface.

According to another aspect of the disclosure, the elongate body is substantially made of a non-wood material.

According to another aspect of the disclosure, there is a thermal break for providing a surface for mounting a fixture thereon, the thermal break comprising an elongate body, the elongate body comprising: (i) one or more thermal insulating materials; (ii) a fixture-mounting surface that is suitable for supporting a fixture; (iii) a surface opposite the fixture-mounting surface; (iv) a first contacting surface, at least a portion of which is suitable for contacting a fascia wythe; and (v) a second contacting surface opposite the first contacting surface, at least a portion of which is suitable for contacting a structural wythe; wherein the first contacting surface and the second contacting surface extend between the fixture-mounting surface and the surface opposite the fixture-mounting surface. The thermal break further comprises one or more protrusions extending away from at least one of the first contacting surface and the second contacting surface.

According to another aspect of the disclosure, there is a thermal break for providing a surface for mounting a fixture thereon, the thermal break comprising an elongate body, the elongate body comprising: (i) one or more thermal insulating materials; (ii) a fixture-mounting surface that is suitable for supporting a fixture; (iii) a surface opposite the fixture-mounting surface; (iv) a first contacting surface, at least a portion of which is suitable for contacting a fascia wythe; and (v) a second contacting surface opposite the first contacting surface, at least a portion of which is suitable for contacting a structural wythe; wherein the first contacting surface and the second contacting surface extend between the fixture-mounting surface and the surface opposite the fixture-mounting surface. One or more protrusions are coupled to and extend away from the second contacting surface, and no protrusions extend away from the first contacting surface.

According to another aspect of the disclosure, there is a thermal break for providing a surface for mounting a fixture thereon, the thermal break comprising an elongate body, the elongate body comprising: (i) one or more thermal insulating materials; (ii) a fixture-mounting surface that is suitable for supporting a fixture; (iii) a surface opposite the fixture-mounting surface; (iv) a first contacting surface, at least a portion of which is suitable for contacting a fascia wythe; and (v) a second contacting surface opposite the first contacting surface, at least a portion of which is suitable for contacting a structural wythe; wherein the first contacting surface and the second contacting surface extend between the fixture-mounting surface and the surface opposite the fixture-mounting surface. The thermal break further comprises a plurality of protrusions. The plurality of protrusions comprise: (i) one or more first protrusions coupled to the first contacting surface, wherein the one or more first protrusions extend away from the elongate body; and (ii) one or more second protrusions coupled to the second contacting surface, wherein the one or more second protrusions extend away from the elongate body.

According to another aspect of the disclosure, there is a method of constructing an exterior wall comprising a thermal break positioned between a fascia wythe and a structural wythe. The thermal break comprises an elongate body. The elongate body comprises: (i) one or more thermal insulating materials; (ii) a fixture-mounting surface that is suitable for supporting a fixture; (iii) a surface opposite the fixture-mounting surface; (iv) a first contacting surface, at least a portion of which is suitable for contacting a fascia wythe; and (v) a second contacting surface opposite the first contacting surface, at least a portion of which is suitable for contacting a structural wythe. The first contacting surface and the second contacting surface extend between the fixture-mounting surface and the surface opposite the fixture-mounting surface. The method comprises the steps of: (a) mounting the fixture-mounting surface of an elongate body of the thermal break to a formwork that forms a perimeter around an area; (b) pouring a first layer of wet concrete within the area such that the first layer of wet concrete contacts at least the first contacting surface; (c) positioning an insulating material adjacent the surface opposite the fixture-mounting surface and over the first layer of wet concrete; (d) allowing the first layer of wet concrete to set and form the fascia wythe of the exterior wall; (e) pouring a second layer of wet concrete over the insulating material and the thermal break within the area such that the second layer of wet concrete contacts at least the second contacting surface; and (f) allowing the second layer of wet concrete to set and form the structural wythe of the exterior wall.

According to another aspect of the disclosure, there is an exterior wall for tilt-up construction comprising: (a) a fascia wythe of the exterior wall; (b) a structural wythe of the exterior wall; (c) a layer of insulating material positioned between the fascia wythe and the structural wythe; and (d) a thermal break positioned between at least a portion of the fascia wythe and at least a portion of the structural wythe. The thermal break comprises an elongate body. The elongate body comprises: (i) one or more thermal insulating materials; (ii) a fixture-mounting surface that is suitable for supporting a fixture; (iii) a surface opposite the fixture-mounting surface; (iv) a first contacting surface, at least a portion of which is suitable for contacting a fascia wythe; and (v) a second contacting surface opposite the first contacting surface, at least a portion of which is suitable for contacting a structural wythe. The first contacting surface and the second contacting surface extend between the fixture-mounting surface and the surface opposite the fixture-mounting surface. In the exterior wall, the surface opposite the fixture-mounting surface is at least in contact with the layer of insulating material, the fascia wythe is at least in contact with the first contacting surface, the structural wythe is at least in contact with the second contacting surface, and the fixture-mounting surface of the elongate body is co-planar with an outside edge of the fascia wythe and an outside edge of the structural wythe.

According to another aspect of the disclosure, there is a method of constructing an exterior wall comprising a thermal break positioned between a fascia wythe and a structural wythe. The thermal break comprises an elongate body. The elongate body comprises: (i) one or more thermal insulating materials; (ii) a fixture-mounting surface that is suitable for supporting a fixture; (iii) a surface opposite the fixture-mounting surface; (iv) a first contacting surface, at least a portion of which is suitable for contacting a fascia wythe; and (v) a second contacting surface opposite the first contacting surface, at least a portion of which is suitable for contacting a structural wythe. The first contacting surface and the second contacting surface extend between the fixture-mounting surface and the surface opposite the fixture-mounting surface. The method comprises the steps of: (a) providing a formwork that forms a perimeter around an area; (b) supporting the thermal break within the area on one or more supporting bases, wherein the one or more supporting bases is in contact with the surface that is opposite the fixture-mounting surface; (c) positioning the thermal break in the area, such that a space is provided between the first contacting surface of the thermal break and the formwork; (d) pouring a first layer of wet concrete within the area such that the first layer of wet concrete contacts at least the surface opposite the fixture-mounting surface; (e) positioning an insulating material over the first layer of wet concrete and in contact with a portion of the second contacting surface; (f) allowing the first layer of wet concrete to set; (g) pouring a second layer of wet concrete in between the formwork and the first contacting surface of the thermal break such that the second layer of wet concrete contacts the formwork and the first contacting surface; (h) allowing the second layer of wet concrete to set; (i) setting the first layer of wet concrete and the second layer of wet concrete to form the fascia wythe; (j) pouring a third layer of wet concrete over the insulating material such that the third layer of wet concrete contacts the first contacting surface and immerses one or more protrusions extending away from the first contacting surface; and (k) allowing the third layer of wet concrete to set and form the structural wythe of the exterior wall.

According to another aspect of the disclosure, there is an exterior wall for tilt-up construction comprising: (a) a fascia wythe of the exterior wall; (b) a structural wythe of the exterior wall; (c) a layer of insulating material positioned between the fascia wythe and the structural wythe; and (d) a thermal break positioned between at least a portion of the fascia wythe and at least a portion of the structural wythe. The thermal break comprises an elongate body. The elongate body comprises: (i) one or more thermal insulating materials; (ii) a fixture-mounting surface that is suitable for supporting a fixture; (iii) a surface opposite the fixture-mounting surface; (iv) a first contacting surface, at least a portion of which is suitable for contacting a fascia wythe; and (v) a second contacting surface opposite the first contacting surface, at least a portion of which is suitable for contacting a structural wythe. The first contacting surface and the second contacting surface extend between the fixture-mounting surface and the surface opposite the fixture-mounting surface. In the exterior wall, the fascia wythe is in contact with the surface opposite the fixture-mounting surface and the first contacting surface, the layer of insulating material is in contact with a portion of the second contacting surface, the structural wythe is in contact with a portion of the first contacting surface and immerses one or more protrusions extending away from the first contacting surface, and the fixture-mounting surface is co-planar with an outside edge of the fascia wythe and an outside edge of the structural wythe.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE DRAWINGS

In the accompanying drawings, which illustrate one or more exemplary embodiments:

FIG. 1(a) is a sectional view of a prior art "tilt-up" exterior wall comprising a structural wythe, a fascia wythe, and insulating material therebetween.

FIG. 1(b) is a sectional view of a prior art "tilt-up" exterior wall comprising a structural wythe, a fascia wythe, insulating material therebetween, and a fixture mounted to a surface of the structural wythe and a surface of the insulating material.

FIG. 1(c) is a sectional view of a prior art "tilt-up" exterior wall comprising a structural wythe, a fascia wythe, insulating material therebetween, and a piece of wood that separates the insulating material from a fixture, the fixture being mounted to a surface of the structural wythe and a surface of the piece of wood.

FIG. 11(a) shows the thermal break coupled to the formwork; FIG. 11(b) shows the thermal break, and the fascia wythe and insulating material of the exterior wall; FIG. 11(c) shows the thermal break, and the fascia wythe, insulating material and structural wythe of the exterior wall.

FIG. 12(a) shows the thermal break supported by a supporting base, and positioned next to formwork; FIG. 12(b) shows the thermal break, a portion of the fascia wythe into which a portion of a reinforcing bar is immersed (as depicted in stippled lines), and insulating material; FIG. 12(c) shows the thermal break, and the fascia wythe and insulating material of the exterior wall; FIG. 12(d) shows the thermal break, and the fascia wythe, insulating material and structural wythe of the exterior wall.

Figure 2A:
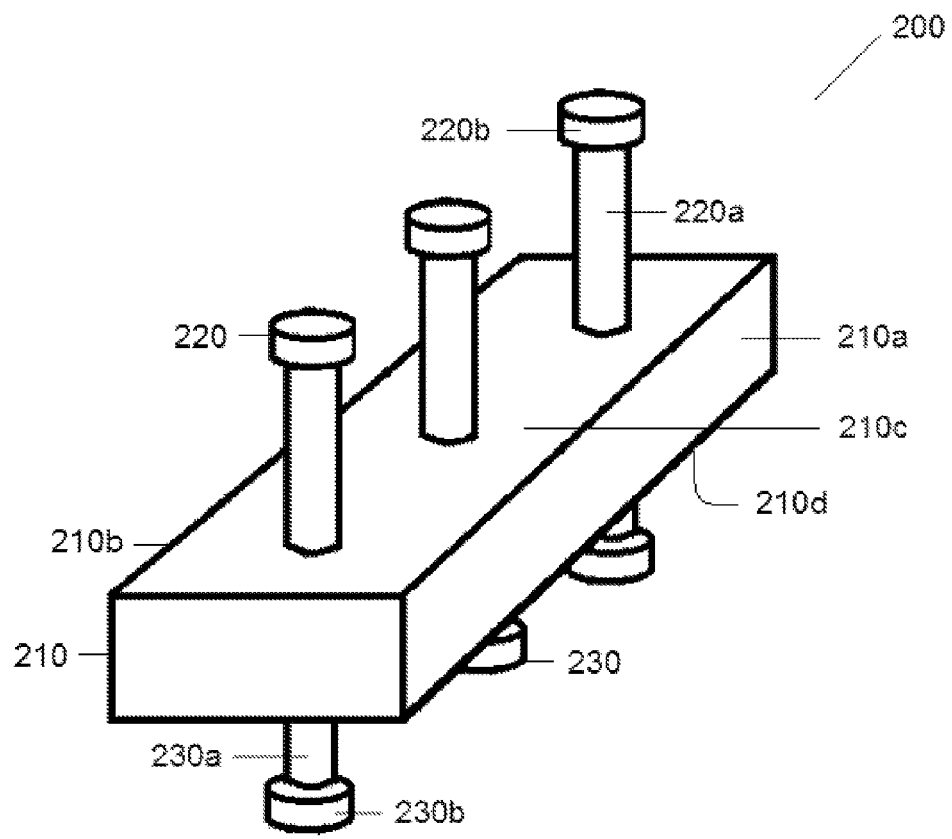
FIG. 2(a) is a perspective view of a thermal break according to a first embodiment, the thermal break comprising an elongate body, and first protrusions and second protrusions extending from the elongate body.

The drawings are for illustrative purposes only, and are not drawn to scale. The dimensions of the components of the thermal break may be of any suitable dimensions.

DETAILED DESCRIPTION

Directional terms such as "top," "bottom," "upwards," "downwards," "vertically," and "laterally" are used in the following description for the purpose of providing relative reference only, and are not intended to suggest any limitations on how any article is to be positioned during use, or to be mounted in an assembly or relative to an environment. Any element expressed in the singular form also encompasses its plural form. Any element expressed in the plural form also encompasses its singular form.

The present disclosure relates to a thermal break for use in construction, and more specifically a thermal break for use in tilt-up construction that provides a weight-bearing surface to which a fixture can be mounted. The present disclosure further relates to an exterior wall comprising the thermal break, and a method of constructing the exterior wall comprising the thermal break.

Thermal Break

Referring to FIGS. 2(a) to 2(g), and according to a first embodiment, there is shown a thermal break 200 for use in exterior walls for tilt-up construction. Thermal break 200 comprises an elongate body 210 comprising a fixture-mounting surface 210a and a surface 210b that is opposite surface 210a. In addition, two opposite contacting surfaces 210c and 210d extend between fixture-mounting surface 210a and surface 210b. In use, fixture-mounting surface 210a is suitable for mounting a fixture, surface 210b is suitable for mounting or contacting an insulating material, contacting surface 210c is suitable for contacting at least a portion of a fascia wythe, and contacting surface 210d is suitable for contacting at least a portion of a structural wythe. First protrusions 220 are coupled to and extend away from contacting surface 210c, and second protrusions 230 are coupled to and extend away from contacting surface 210d. First protrusions 220 and second protrusions 230 therefore extend away from the elongate body 210 in opposite directions.

First protrusions 220 each comprise an elongate extension 220a and a head 220b. Second protrusions 230 each comprise an elongate extension 230a and a head 230b. Elongate extensions 220a, 230a separate the elongate body 210 from heads 220b, 230b. Elongate extensions 220a, 230a are depicted in FIGS. 2(a) to 2(d) as cylindrical. However, in other embodiments, elongate extensions 220a, 230a may be any suitable shape such as, but not limited to, a geometric prism, a frustum or an inverted frustum. Heads 220b, 230b are depicted as cylindrical in FIGS. 2(a) to 2(d), and have a greater cross sectional area than elongate extensions 220a, 230a. In other embodiments, head 220b, 230b may be any suitable shape such as, but not limited to, a sphere, an ovoid, or a square or geometric prism. In FIGS. 2(a) to 2(d), first protrusions 220 and second protrusions 230 are depicted as extending orthogonally away from contacting surfaces 210c and 210d respectively. However, in other embodiments, first protrusions 220 and second protrusions 230 may extend away from contacting surfaces 210c and 210d respectively in a non-orthogonal manner.

Figure 2B:
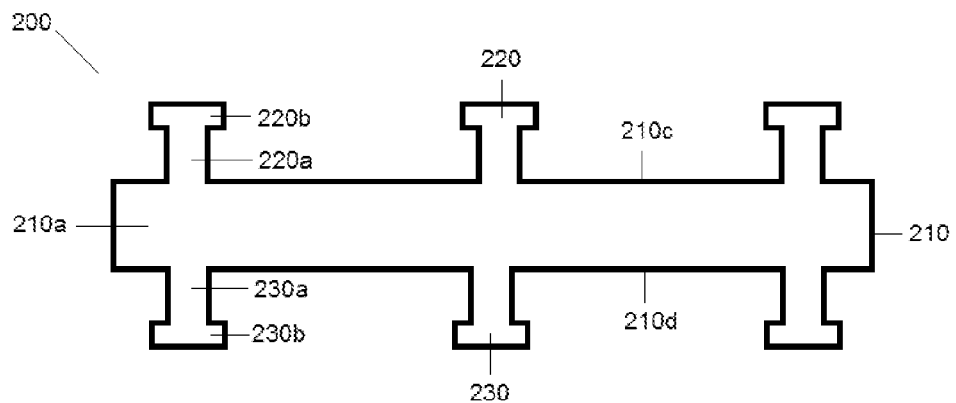
FIGS. 2(b), 2(c) and 2(d) are side views of different configurations of the thermal break of FIG. 2(a).
Figure 2C:
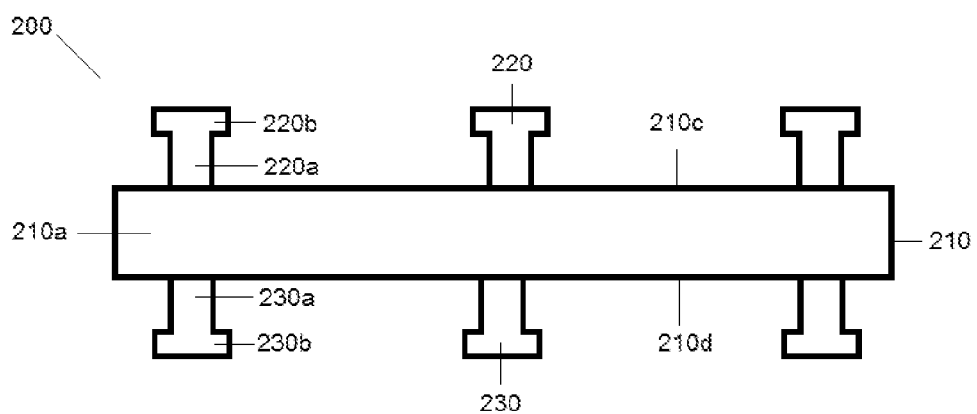
Figure 2D:
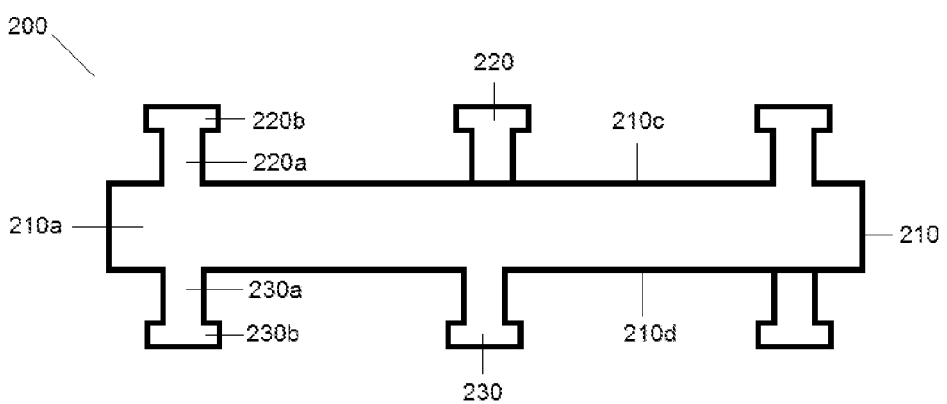

Referring to FIG. 2(b), first protrusions 220 and second protrusions 230 are formed from the same material as elongate body 210 and are integrally formed with elongate body 210 such that thermal break 200 is one continuous piece. Alternatively, and as depicted in FIG. 2(c), first protrusions 220 and second protrusions 230 are not integrally formed with elongate body 210. Instead, first protrusions 220 and second protrusions 230 are coupled to elongate body 210 by methods known in the art. For example, elongate body 210 may have one or more receivers (not shown) in contacting surface 210c and contacting surface 210d of elongate body 210. First protrusions 220 and second protrusions 230 may couple to elongate body 210 by inserting one or more extensions (not shown) coupled to and extending away from first protrusions 220 and second protrusions 230 into the one or more receivers in contacting surface 210c and contacting surface 210d of elongate body 210. Alternatively, and as depicted in FIG. 2(d), one or more protrusions 220, 230 are integrally formed with elongate body 210, while one or more protrusions 220, 230 are not. In other embodiments, first protrusions 220 and second protrusions 230 are made of a material (e.g. metal, metal alloy, or a plastic) that is different from the material of elongate body 210.

Figure 2G:
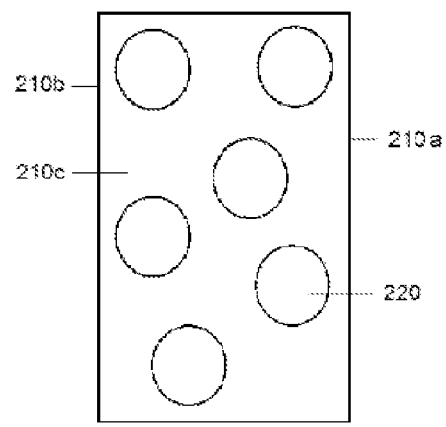
FIG. 2(g) is a top view of an alternative embodiment of the thermal break of FIG. 2(a) with the first protrusions randomly arranged on the surface of the elongate body.
Figure 2F:
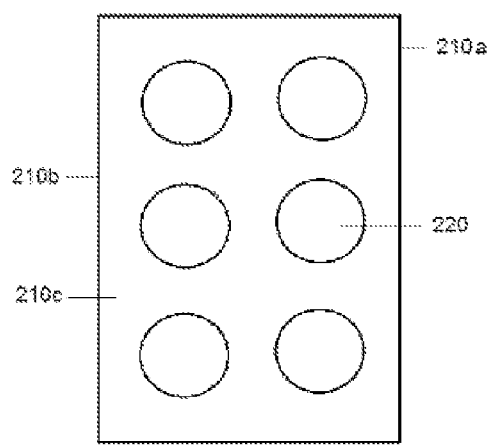
FIG. 2(f) is a top view of an alternative embodiment of the thermal break of FIG. 2(a) with the first protrusions arranged in a matrix on the surface of the elongate body.
Figure 2E:
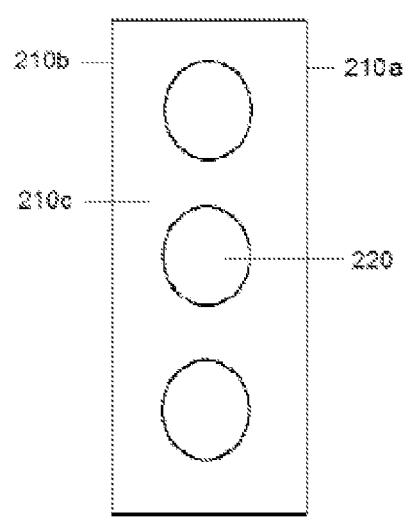
FIG. 2(e) is a top view of the thermal break of FIG. 2(a) with the first protrusions arranged in a row on a surface of the elongate body.

As described in greater detail below, during "tilt-up" construction of an exterior wall, wet concrete contacts contacting surface 210c, immerses first protrusions 220, and sets to form the fascia wythe of the exterior wall. Wet concrete also contacts contacting surface 210d, immerses second protrusions 230, and sets to form the structural wythe of the exterior wall. Heads 220b, 230b may beneficially anchor the thermal break 200 to the fascia wythe and the structural wythe. Additional anchoring surfaces or extensions (not shown) may be added to the first and second protrusions 220, 230. As depicted in FIGS. 2(a) to 2(e), first protrusions 220 are arranged in a row on contacting surface 210c of elongate body 210. In other embodiments, first protrusions 220 may be arranged in any arrangement, for example in two or more rows on contacting surface 210c of elongate body 210 (as depicted in FIG. 2(f)), or randomly on contacting surface 210c of elongate body 210 (as depicted in FIG. 2(g)). Second protrusions 230 may have the same arrangement on contacting surface 210d of elongate body 210 as the first protrusions 220 or a different arrangement.

Figure 3:
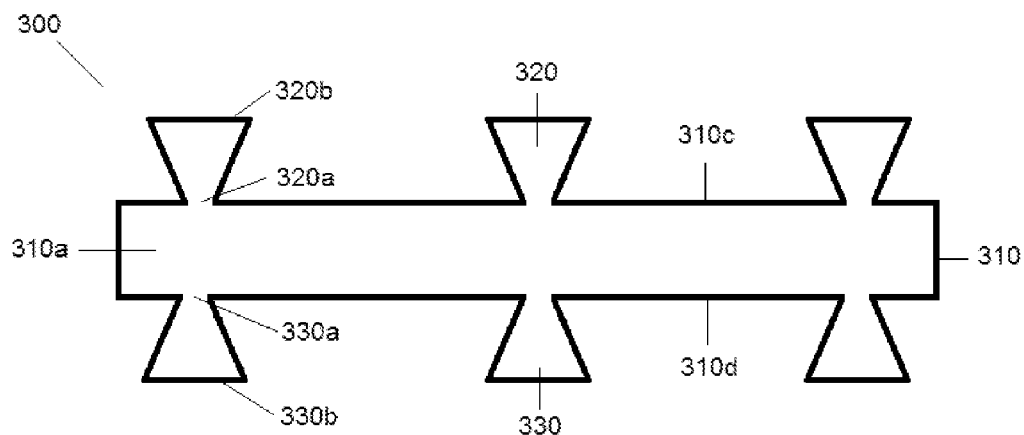
FIG. 3 is a side view of a thermal break according to a second embodiment with the first protrusions and the second protrusions shaped as inverted frustums.

Referring to FIG. 3, and according to a second embodiment, there is shown a thermal break 300 for use in exterior walls for tilt-up construction. Thermal break 300 comprises an elongate body 310 having a fixture-mounting surface 310a and a surface that is opposite surface 310a (not shown). In addition, two opposite contacting surfaces 310c and 310d extend between fixture-mounting surface 310a and the surface that is opposite surface 310a (not shown). In use, fixture-mounting surface 310a is suitable for mounting a fixture, the surface that is opposite surface 310a (not shown) is suitable for mounting or contacting an insulating material, contacting surface 310c is suitable for contacting a fascia wythe, and contacting surface 310d is suitable for contacting a structural wythe. First protrusions 320 are coupled to and extend away from contacting surface 310c, and second protrusions 330 are coupled to and extend away from contacting surface 310d.

First protrusions 320 each comprise a first end 320a and a second end 320b. Second protrusions 330 each comprise a first end 330a and a second end 330b. The first end 320a, 330a of each protrusion 320, 330 is coupled to the elongate body 310 and has a smaller cross sectional area (i.e. is less wide) than the second end 320b, 330b of each protrusion 320, 330. Protrusions 320, 330 may be any suitable shape such as, but not limited to, an inverted conical frustum, an inverted square frustum, or other inverted geometric frustum. The wider second ends 320b, 330b of the protrusions 320, 330 may beneficially anchor thermal break 300 to the fascia wythe and the structural wythe. Additional anchoring surfaces or extensions (not shown) may be added to protrusions 320, 330.

Figure 4:
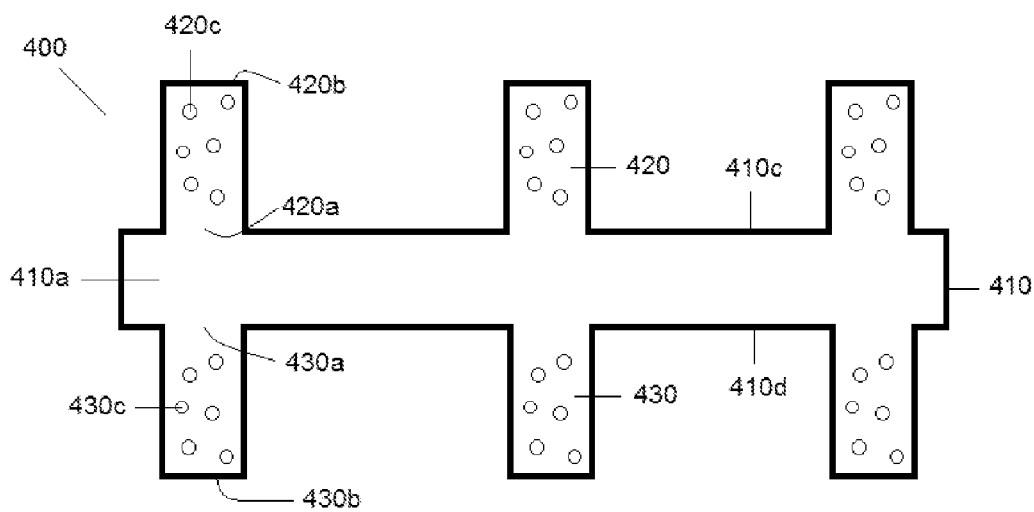
FIG. 4 is a side view of a thermal break according to a third embodiment with the first protrusions and second protrusions being porous.

Referring to FIG. 4, and according to a third embodiment, there is shown a thermal break 400 for use in exterior walls for tilt-up construction. Thermal break 400 comprises an elongate body 410 having a fixture-mounting surface 410a and a surface that is opposite surface 410a (not shown). Two opposite contacting surfaces 410c and 410d extend between fixture-mounting surface 410a and the surface that is opposite surface 410a (not shown). In use, fixture-mounting surface 410a is suitable for mounting a fixture, the surface that is opposite surface 410a (not shown) is suitable for mounting or contacting an insulating material, contacting surface 410c is suitable for contacting a fascia wythe, and contacting surface 410d is suitable for contacting a structural wythe. First protrusions 420 are coupled to and extend away from contacting surface 410c, and second protrusions 430 are coupled to and extend away from contacting surface 410d.

First protrusions 420 each comprise a first end 420a and a second end 420b, and second protrusions 430 each comprise a first end 430a and a second end 430b. The first end 420a, 430a of each protrusion 420, 430 is coupled to the elongate body 410. While the widths of the first end 420a, 430a and the second end 420b, 430b of each protrusion 420, 430 are depicted as being the same in FIG. 4, the second end 420b, 430b may be wider than the first end 420a, 430a (similar to the embodiment depicted in FIG. 3), or narrower than the first end 420a, 430a. In addition, protrusions 420, 430 may be of any suitable shape such as, but not limited to, a cylinder or other geometric prism, an inverted frustum, or a frustum. Protrusions 420, 430 comprise one or more pores 420c, 430c, which may partially extend into protrusions 420, 430 or extend through protrusions 420, 430. Pores 420c, 430c increase the surface area of protrusions 420, 430 that interacts with the wet concrete that sets to form the fascia and structural wythes. The wet concrete may enter pores 420c, 430c and set within pores 420c, 430c, thereby resulting in concrete extensions into protrusions 420, 430. These concrete extensions further anchor the thermal break 400 to the fascia and structural wythes. Additional anchoring surfaces or extensions (not shown) may be added to protrusions 420, 430.

Referring to FIGS. 5(a) to 5(d), and according to a fourth embodiment, there is shown of a thermal break 500 for use in exterior walls for tilt-up construction. Thermal break 500 comprises an elongate body 510 having a fixture-mounting surface 510a and a surface that is opposite surface 510a (not shown). Two opposite contacting surfaces 510c and 510d extend between fixture-mounting surface 510a and the surface that is opposite surface 510a (not shown). In use, fixture-mounting surface 510a is suitable for mounting a fixture, the surface that is opposite surface 510a (not shown) is suitable for mounting or contacting an insulating material, contacting surface 510c is suitable for contacting a fascia wythe, and contacting surface 510d is suitable for contacting a structural wythe.

Bores 520 extend through elongate body 510 between contacting surfaces 510c and 510d. Bores 520 may be formed in elongate body 510 after elongate body 510 has cured from the manufacturing process. In the alternative, bores 520 are formed during the molding process of elongate body 510. Three bores 520 are depicted in FIGS. 5(a) to 5(d). However, in other embodiments, any number of bores 520 may be formed in elongate body 510. In FIGS. 5(a) to 5(d), the bores 520 are arranged in a column or row through elongate body 510 between contacting surfaces 510c and 510d. In other embodiments, bores 520 may be arranged in one or more columns and rows through elongate body 510, or randomly through the elongate body 510 between contacting surfaces 510c and 510d.

Figure 5A:
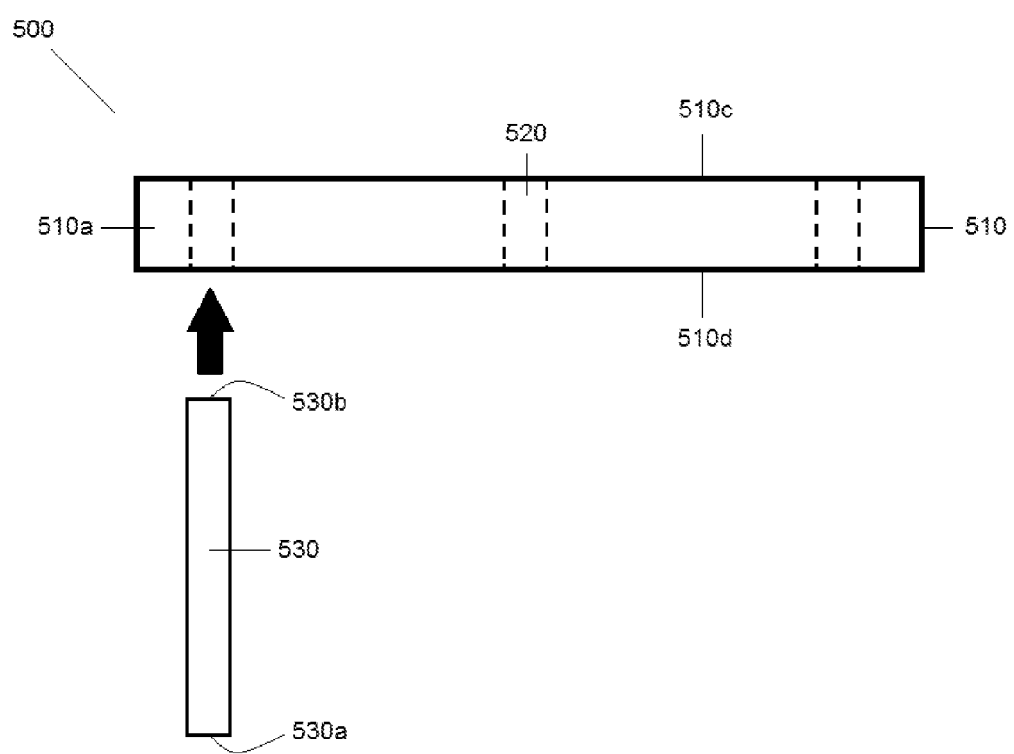
FIG. 5(a) is a side view of a thermal break according to a fourth embodiment comprising an elongate body with bores extending therethrough and rods for inserting through the bores.
Figure 5B:
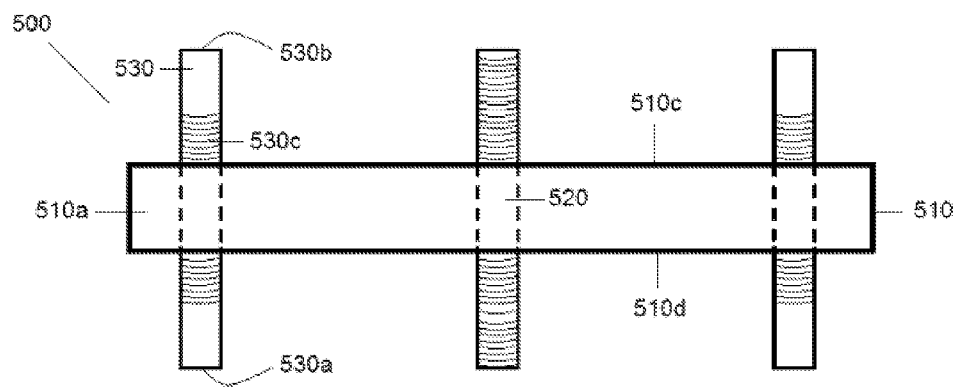
FIG. 5(b) is a side view of the thermal break depicted in FIG. 5(a), with the rods received in the bores to form first and second protrusions.
Figure 5C:
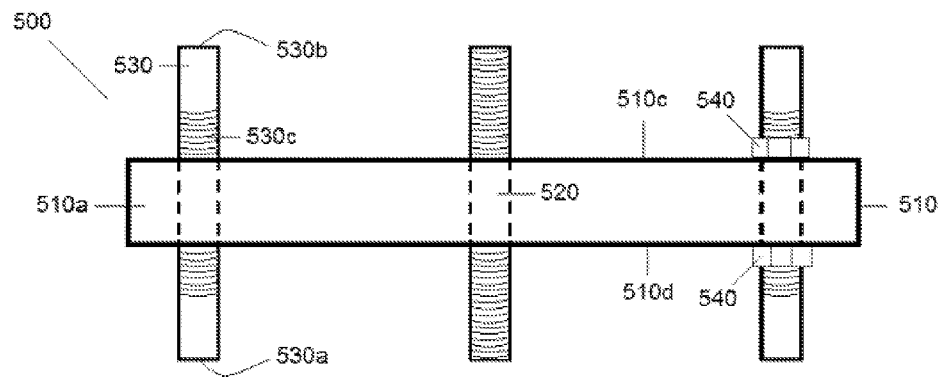
FIG. 5(c) is a side view of the thermal break depicted in FIG. 5(b), with the rods coupled to the elongate body by nuts.

Rods 530 each comprise an end portion 530a, an end portion 530b and a middle portion extending between the end portion 530a and the end portion 530b. Referring to FIG. 5(b), the middle portion of each rod 530 is received within one of the bores 520 of the elongate body 510, the end portion 530b forms a first protrusion, and the end portion 530a forms a second protrusion. A portion of the end portions 530a, 530b of each rod 530 that is adjacent the elongate body 510 is threaded with threads 530c. To secure rods 530 in their desired positions relative to elongate body 510, washers (not shown) are received on the end portion 530a and end portion 530b and positioned adjacent the elongate body 510. Referring to FIG. 5(c), nuts 540 are received on the end portion 530a and end portion 530b of the rods 530, and engage the threads 530c on either side of elongate body 510. The nuts 540 engage threads 530c in a manner such that the washers (not shown) are pressed against contacting surfaces 510c and 510d of elongate body 510, and the nuts 540 prevent rod 530 from shifting relative to the elongate body 510. In other embodiments, washers may not be present. In other embodiments, any suitable fastener known in the art, such as a clip or bolt, may be used to secure rods 530 relative to elongate body 510.

Figure 5D:
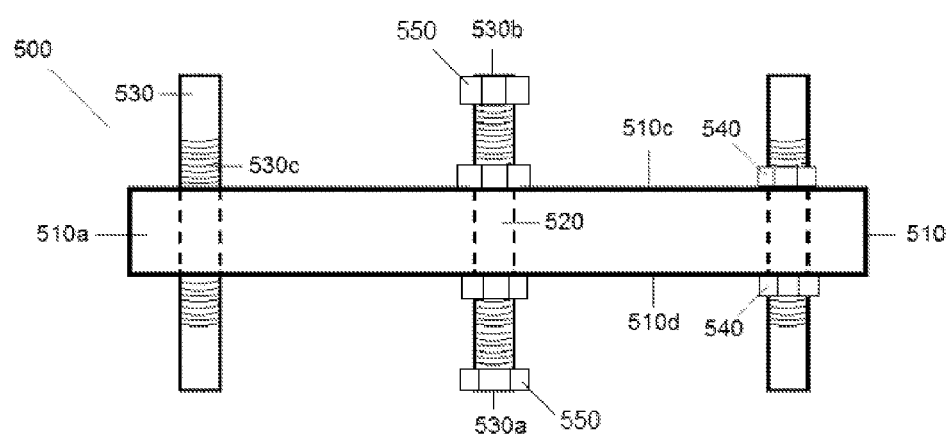
FIG. 5(d) is a side view of the thermal break depicted in FIG. 5(a) with the rods coupled to the elongate body by nuts, and nuts coupled to the ends of at least one of the rods.

Rods 530 and bores 520 may be of any suitable shape such as, but not limited to, a cylinder or other geometric prism. Rods 530 and nuts 540 may be made of a nylon material. In other embodiment, rods 530 and nuts 540 may be made of any suitable material such as metal, metal alloy, or plastic materials. Anchoring surfaces or extensions may be added to the rods 530, and these anchoring surfaces or extensions may beneficially anchor the thermal break 500 to the fascia wythe and the structural wythe. For example, and as depicted in FIG. 5(d), ends of end portions 530a, 530b of rod 530 may be threaded to receive one or more additional nuts 550. Additional nut 550 may be threaded onto rod 530 and spaced from contacting surfaces 510c and 510d of elongate body 510 to provide an anchorage structure for the wet concrete of the fascia and structural wythes to surround during construction of an exterior wall.

Figure 6A:
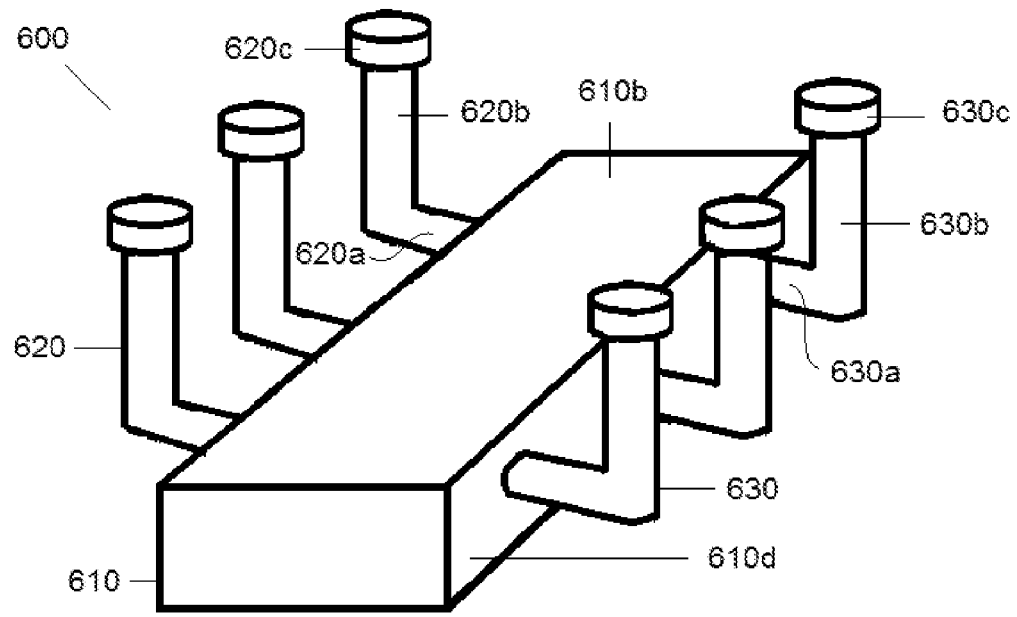
FIG. 6(a) is a perspective view of a thermal break according to a fifth embodiment comprising an elongate body, and first protrusions and second protrusions extending from the elongate body.
Figure 6B:
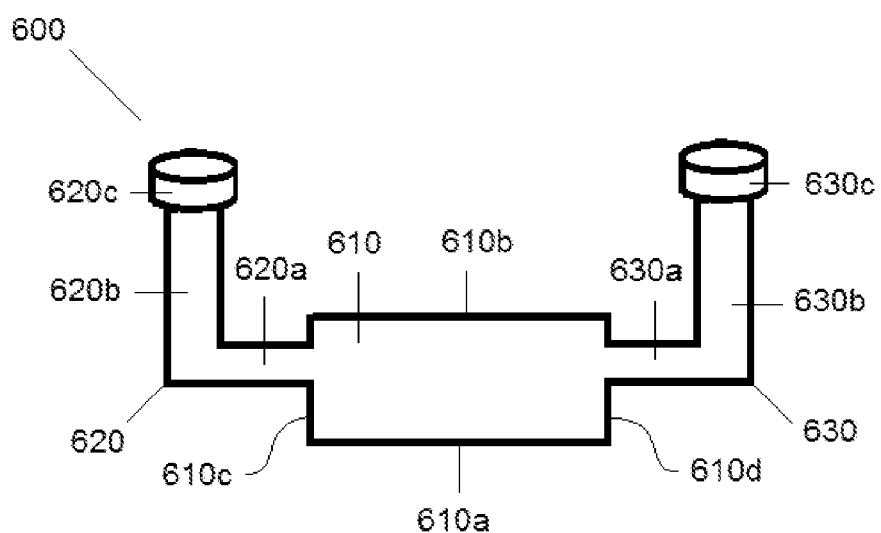
FIG. 6(b) is an end view of the thermal break depicted in FIG. 6(a).

Referring to FIGS. 6(a) and 6(b), and according to a fifth embodiment, there is shown a thermal break 600 for use in exterior walls for tilt-up construction. Thermal break 600 comprises an elongate body 610 comprising a fixture-mounting surface 610a and an opposite surface 610b. Two opposite contacting surfaces 610c and 610d extend between the fixture-mounting surface 610a and surface 610b. First protrusions 620 are coupled to contacting surface 610c, and second protrusions 630 are coupled to contacting surface 610d. In use, fixture-mounting surface 610a is suitable for mounting a fixture, surface 610b is suitable for mounting or contacting an insulating material, contacting surface 610c is suitable for contacting a fascia wythe, and contacting surface 610d is suitable for contacting a structural wythe.

First protrusions 620 each comprise a first extension 620a, a second extension 620b, and a head 620c. Second protrusions 630 each comprise a first extension 630a, a second extension 630b, and a head 630c. First extension 620a, 630a extends away from elongate body 610. Second extension 620b, 630b is coupled to first extension 620a, 630b and extends away from first extension 620a, 630a. Head 620c, 630c is coupled to second extension 620b, 630b.

As depicted in FIG. 6(a), second extension 620b, 630b is integrally formed with first extension 620a, 630a. However, in other embodiments, second extension 620b, 630b may not be integrally formed with first extension 620a, 630a. Extensions 620a, 620b, 630a, 630b are depicted in FIGS. 6(a) and 6(b) as cylindrical. However, in other embodiments, extensions 620a, 620b, 630a, 630b may be any suitable shape such as, but not limited to, a geometric prism, a frustum or an inverted frustum. Head 620c, 630c is connected to second extension 620b, 630b. As depicted in FIGS. 6(a) and 6(b), head 620c, 630c are cylindrical, and have a greater cross sectional area than second elongate extension 620b, 630b. However, in other embodiments, head 620c, 630c may be any suitable shape such as, but not limited to, a sphere, an ovoid, or a square or geometric prism.

In general, the axis along which a first extension extends away from elongate body 610 intersects and does not overlap with the axis along which a second extension extends away from the first extension. As depicted in FIGS. 6(a) and 6(b), second extension 620b, 630b is perpendicular to first extension 620a, 630a. In other embodiments, second extension 620b, 630b may be arranged in any suitable spatial orientation relative to first extension 620a, 630a.

As depicted in FIG. 6(b), first protrusions 620 and second protrusions 630 are formed from the same material as elongate body 610 and are integrally formed with elongate body 610 such that thermal break 600 is one continuous piece. Alternatively, first protrusions 620 and second protrusions 630 are not integrally formed with elongate body 610, and instead, first protrusions 620 and second protrusions 630 are coupled to elongate body 610 by methods known in the art. Alternatively, one or more protrusions 620, 630 are integrally formed with elongate body 610, while one or more protrusions 620, 630 are not. In other embodiments, first protrusions 620 and second protrusions 630 are made of a material (e.g. metal, metal alloy, or a plastic) that is different from the material of elongate body 610. In alternative embodiments, head 620c and/or head 630c may not be present.

During "tilt-up" construction of an exterior wall, wet concrete contacts contacting surface 610c, immerses the first protrusions 620, and sets to form the fascia wythe of the exterior wall. Wet concrete also contacts contacting surface 610d, immerses the second protrusions 630, and sets to form the structural wythe of the exterior wall. Heads 620c, 630c, and the spatial orientation of second extension 620b, 630b relative to first extension 620a, 630a, may beneficially anchor the thermal break 600 to the fascia wythe and the structural wythe. Additional anchoring surfaces or extensions (not shown) may be added to the first and second protrusions 620, 630.

Figure 7A:
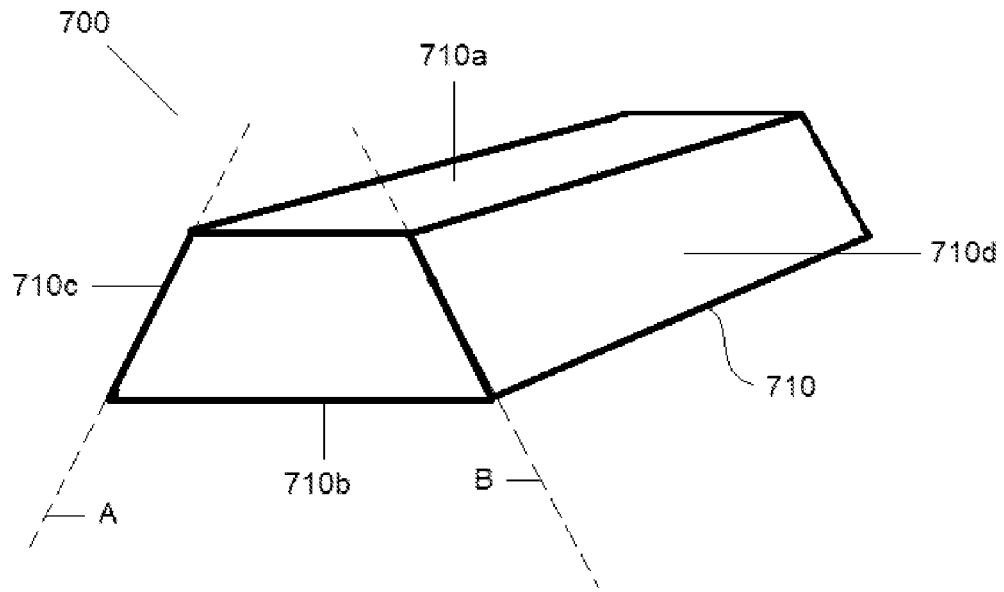
FIG. 7(a) is a perspective view of a thermal break according a configuration of a sixth embodiment, the thermal break comprising an elongate body with a cross-sectional shape of a trapezoid.
Figure 7B:
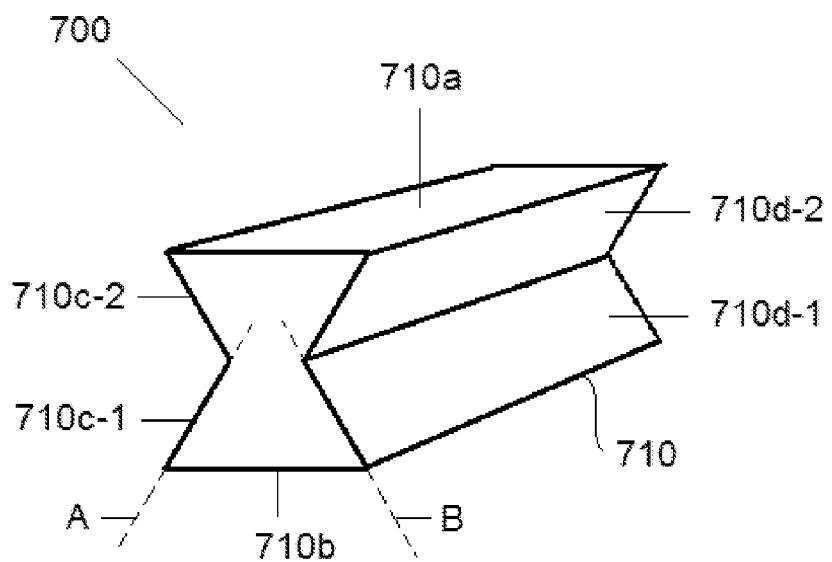
FIG. 7(b) is a perspective view of a thermal break according to another configuration of the sixth embodiment, the thermal break comprising an elongate body with a cross-sectional shape of an hour-glass.

Referring to FIGS. 7(a) and 7(b), and according to a sixth embodiment, there is shown a thermal break 700 for use in exterior walls for tilt-up construction. Thermal break 700 comprises an elongate body 710 comprising a fixture-mounting surface 710a and an opposite surface 710b. In addition, two opposite contacting surfaces 710c and 710d extend between fixture-mounting surface 710a and surface 710b. In use, fixture-mounting surface 710a is suitable for mounting a fixture, surface 710b is suitable for mounting or contacting an insulating material, contacting surface 710c is suitable for contacting a fascia wythe, and contacting surface 710d is suitable for contacting a structural wythe. Contacting surface 710c comprises a first surface portion that extends along a first axis; contacting surface 710d comprises a first surface portion that extends along a second axis; the first and second axes converge towards each other. The converging first and second axes prevent the thermal break 700 from shifting between the structural and fascia wythes.

Referring to FIG. 7(a) and according to a configuration of the sixth embodiment, thermal break 700 is a prism with a cross-sectional shape of an isosceles trapezoid. In other configurations, the thermal break 700 may be any suitable shape. In the thermal break 700 depicted in FIG. 7(a), surface 710b has a width that is greater than fixture-mounting surface 710a. The first surface portion of contacting surface 710c is the entire contacting surface 710c, and the first surface portion of contacting surface 710d is the entire contacting surface 710d. Contacting surface 710c extends along a first axis A, and contacting surface 710d extends along a second axis B. Axes A and B converge towards each other.

Referring to FIG. 7(b) and according to another configuration of the sixth embodiment, thermal break 700 is a prism with a cross-sectional shape of an hour-glass. Contacting surface 710c is divided into two surface portions: surface portion 710c-1 and surface portion 710c-2. Contacting surface 710d is divided into two surface portions: surface portion 710d-1 and surface portion 710d-2. Surface portion 710c-1 extends along a first axis A, and surface portion 710d-1 extends along a second axis B. Axes A and B converge towards each other. The axes of surface portion 710c-2 and 710d-2 also converge towards each other to give the cross-sectional shape of an hour glass.

Figure 8A:
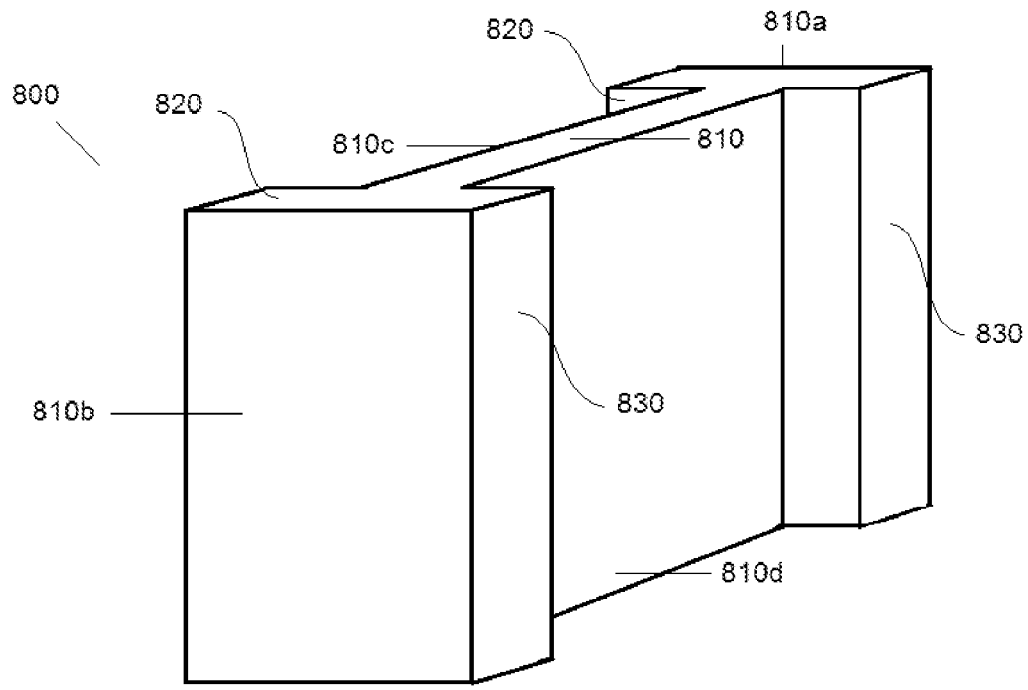
FIG. 8(a) is a perspective view of a thermal break according to a seventh embodiment, the thermal break comprising a cross-sectional shape of an "I".
Figure 8B:
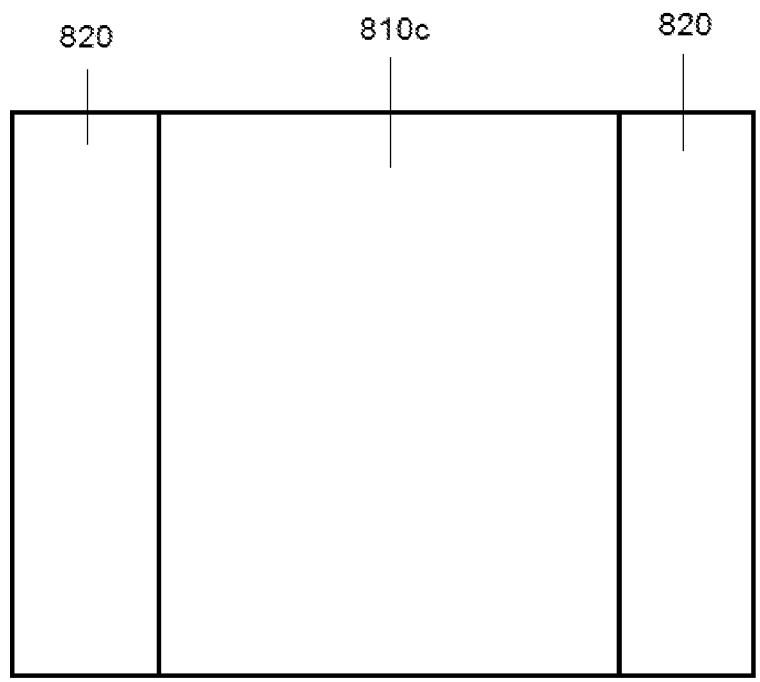
FIG. 8(b) is a side elevation view of the thermal break depicted in FIG. 8(a).

Referring to FIGS. 8(a) and 8(b), and according to a seventh embodiment, there is shown a thermal break 800 for use in exterior walls for tilt-up construction. Thermal break 800 comprises an elongate body 810 comprising a fixture-mounting surface 810a and an opposite surface 810b. In addition, two opposite contacting surfaces 810c and 810d extend between fixture-mounting surface 810a and surface 810b. In use, fixture-mounting surface 810a is suitable for mounting a fixture, surface 810b is suitable for mounting or contacting an insulating material, contacting surface 810c is suitable for contacting a fascia wythe, and contacting surface 810d is suitable for contacting a structural wythe. First protrusions 820 are coupled to and extend away from contacting surface 810c, and second protrusions 830 are coupled to and extend away from contacting surface 810d. First protrusions 820 and second protrusions 830 therefore extend in opposite directions away from the elongate body 810. In this embodiment, first protrusions 820 and second protrusions 830 are flanges.

As depicted in FIGS. 8(a) and 8(b), a first pair of flanges 820, 830 at one end of the elongate body 810 form a rectangular prism comprising surface 810b, and a second pair of flanges 820, 830 at the other end of the elongate body 810 form a rectangular prism comprising fixture-mounting surface 810a such that thermal break 800 has a cross-sectional shape of an "I" when cut along a plane that is perpendicular to contacting surfaces 810c and 810d. However, in other embodiments, flanges 820, 830 may not be positioned at the ends of the elongate body 810. In other embodiments, a plurality of flanges 820 may be arranged in a row on contacting surface 810c, or randomly on contacting surface 810c. Second flanges 830 may have the same or different arrangement on contacting surface 810d as first flanges 820 on contacting surface 810c.

As depicted in FIGS. 8(a) and 8(b), flanges 820, 830 are shaped as rectangular prisms. However, in other embodiments, flanges 820, 830 may be any suitable shape such as, but not limited to, a semi-cylinder or other geometric prism. In FIGS. 8(a) and 8(b), flanges 820, 830 are depicted as extending orthogonally away from contacting surfaces 810c and 810d respectively. However, in other embodiments, flanges 820, 830 may extend away from contacting surfaces 810c and 810d respectively in a non-orthogonal manner.

Figure 9A:
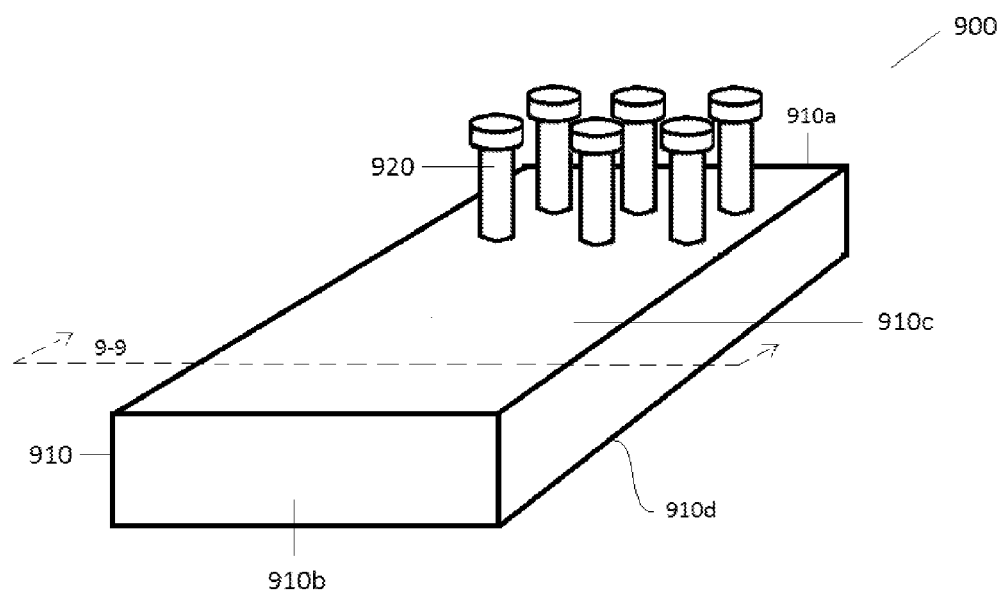
FIG. 9(a) is a perspective view of a thermal break according to an eighth embodiment, the thermal break comprising protrusions extending from a surface of the thermal break elongate body, the thermal break further comprising an additional insulating material within the elongate body.
Figure 9B:
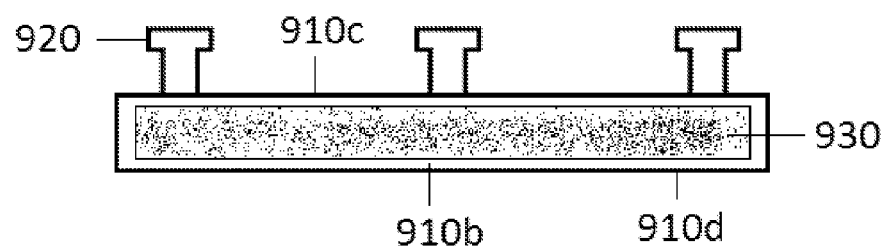
FIG. 9(b) is a cross-sectional front view of the thermal break depicted in FIG. 9(a) along line 9-9, revealing the additional insulating material within the elongate body.

Referring to FIGS. 9(a) and 9(b), and according to an eighth embodiment, there is shown a thermal break 900 for use in exterior walls for tilt-up construction. Thermal break 900 comprises an elongate body 910 comprising a fixture mounting surface 910a and an opposite surface 910b. In addition, two opposite contacting surfaces 910c and 910d extend between surfaces 910a and 910b. In use, fixture-mounting surface 910a is suitable for mounting a fixture, surface 910b is suitable for contacting a fascia wythe, contacting surface 910c is suitable for mounting or contacting an insulation material that is exterior to the elongate body 910 and contacting a structural wythe, and contacting surface 910d is suitable for contacting the fascia wythe. One or more protrusions 920 are coupled to and extend away from contacting surface 910c. As depicted in FIG. 9(a), six protrusions 920 arranged in two rows of three extend away from contacting surface 910c. However in other embodiments, one or more protrusions in any orientation known to a person skilled in the art may extend away from contacting surface 910c.

Referring to FIG. 9(a), protrusions 920 are formed from the same material as elongate body 910 and are integrally formed with elongate body 910 such that thermal break 900 is one continuous piece. Alternatively, protrusions 920 are not integrally formed with elongate body 910. Instead, protrusions 920 are coupled to elongate body 910 by methods known in the art. Alternatively, at least one protrusion 920 is integrally formed with elongate body 910, and at least one protrusion 920 is not. In other embodiments, protrusions 920 are made of a material (e.g. metal, metal alloy, or a plastic) that is different from the material of elongate body 910.

Referring to FIG. 9(b), the interior of the thermal break body 910 comprises an insulating material 930. As contemplated in this embodiment, insulating material 930 is the same material as the insulation material placed in between the fascia wythe and the structural wythe of the exterior wall. Insulating material impedes the loss of thermal energy through the thermal break. In other embodiments, the insulating material 930 is different from the insulation material placed in between the fascia wythe and the structural wythe of the exterior wall.

As described in greater detail below, during "tilt-up" construction of an exterior wall, surfaces 910b and 910d contact against the fascia wythe. A portion of surface 910c is in contact with the insulation material existing between the fascia wythe and the structural wythe. Wet concrete forming the structural wythe contacts at least a portion of the surface 910c, and one or more protrusions 920 are immersed in the wet concrete forming the structural wythe of the exterior wall. One or more protrusions 920 anchor the thermal break 900 to the structural wythe.

Referring to FIGS. 10(a) to 10(d), and according to a ninth embodiment, there is shown a thermal break 1000 for use in exterior walls for tilt-up construction. Thermal break 1000 comprises an elongate body 1010 comprising a fixture-mounting surface 1010a and an opposite surface 1010b. In addition, two opposite contacting surfaces 1010c and 1010d extend between fixture-mounting surface 1010a and surface 1010b. In use, fixture-mounting surface 1010a is suitable for mounting a fixture, surface 1010b is suitable for mounting or contacting an insulating material, contacting surface 1010c is suitable for contacting a fascia wythe, and contacting surface 1010d is suitable for contacting a structural wythe. Protrusions 1030 are coupled to and extend away from contacting surface 1010d.

Protrusions 1030 each comprise an elongate extension 1030a and a head 1030b. Extensions 1030a separate the elongate body 1010 from heads 1030b. Extensions 1030a are depicted in FIGS. 10(a) to 10(d) as cylindrical. However, in other embodiments, extensions 1030a may be any suitable shape such as, but not limited to, a geometric prism, a frustum or an inverted frustum. Heads 1030b are depicted as cylindrical in FIGS. 10(a) to 10(d), and have a greater cross sectional area than extensions 1030a. In other embodiments, head 1030b may be any suitable shape such as, but not limited to, a sphere, an ovoid, or a square or geometric prism. In FIGS. 10(a) to 10(d), protrusions 1030 are depicted as extending orthogonally away from contacting surface 1010d. However, in other embodiments, protrusions 1030 may extend away from contacting surface 1010d in a non-orthogonal manner.

Figure 10A:
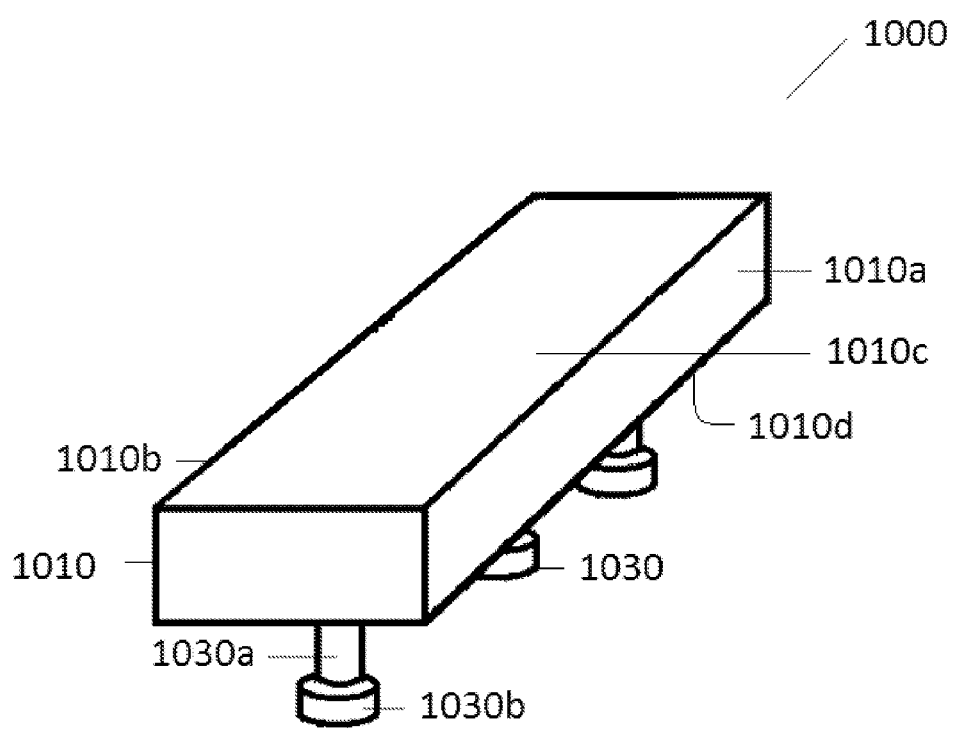
FIG. 10(a) is a perspective view of a thermal break according to a ninth embodiment, the thermal break comprising an elongate body, and protrusions extending from a surface of the elongate body.
Figure 10B:
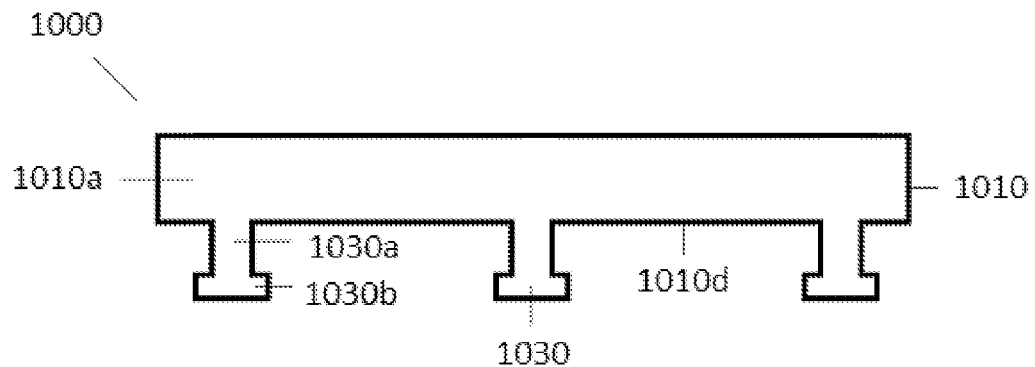
FIGS. 10(b), 10(c) and 10(d) are side views of different configurations of the thermal break of FIG. 10(a).
Figure 10C:
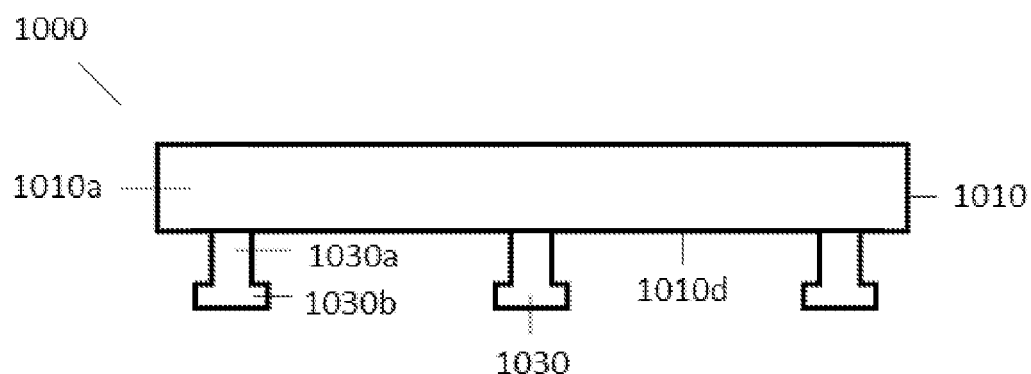
Figure 10D:
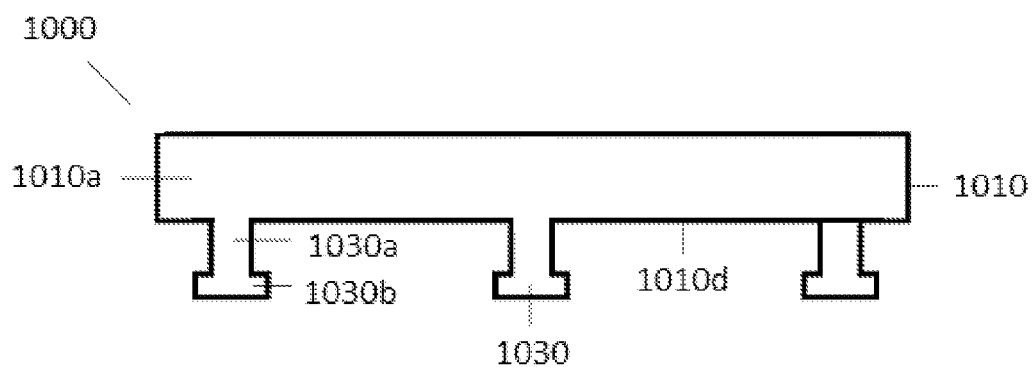

Referring to FIG. 10(b), protrusions 1030 are formed from the same material as elongate body 1010 and are integrally formed with elongate body 1010 such that thermal break 1000 is one continuous piece. Alternatively, and as depicted in FIG. 10(c), protrusions 1030 are not integrally formed with elongate body 1010. Instead, protrusions 1030 are coupled to elongate body 1010 by methods known in the art. Alternatively, and as depicted in FIG. 10(d), one or more protrusions 1030 are integrally formed with elongate body 1010, while one or more protrusions 1030 are not integrally formed with elongate body 1010. In other embodiments, protrusions 1030 are made of a material (e.g. metal, metal alloy, or a plastic) that is different from the material of elongate body 1010.

As contemplated in this embodiment, protrusions 1030 are arranged in a row on contacting surface 1010d of elongate body 1010. In other embodiments, protrusions 1030 may be arranged in any arrangement, for example in two or more rows on contacting surface 1010d of elongate body 1010, or randomly on contacting surface 1010s of elongate body 1010.

During "tilt-up" construction of an exterior wall, wet concrete contacts contacting surface 1010c and sets to form the fascia wythe of the exterior wall. Wet concrete also contacts contacting surface 1010d, immerses protrusions 1030, and sets to form the structural wythe of the exterior wall. Heads 1030b anchor the thermal break 1000 to the structural wythe.

Thermal break 900, 1000 contact and anchor into the structural wythe, and contact but do not anchor into the fascia wythe. Such a configuration accommodates the different rates of expanding and contracting of the thermal break and the fascia wythe, thereby minimizing structural damage to either one of the fascia wythe and thermal break over time.

Elongate body 210, 310, 410, 510, 610, 710, 810, 910, 1010 is constructed of at least one thermal insulating material providing a weight-bearing surface capable of at least partially supporting the weight of a mounted fixture against the pull of gravity. Such fixtures include, but are not limited to, a pre-fabricated industrial grade door frame, window frame, air venting grill, or other building components used to provide an opening through an exterior wall of a building. As contemplated in the embodiments depicted in FIGS. 2 to 10, elongate body 210, 310, 410, 510, 610, 710, 810, 910, 1010 is substantially made of a non-wood based material that is suitable for contacting wet concrete, cured concrete, and insulating material. As contemplated in the embodiments depicted in FIGS. 2 to 10, elongate body 210, 310, 410, 510, 610, 710, 810, 910, 1010 is manufactured of a polyvinyl chloride (PVC) material, such as expanded closed-cell polyvinyl chloride (PVC) foam. However, in other embodiments, the elongate body may be made of fibreglass or a suitable plastic material such as an extrudable thermoplastic material, or high-density polyethylene. In other embodiments, the elongate body manufactured substantially of PVC foam, or fibreglass, or suitable plastic material, or high-density polyethylene, has included within it any one of or a combination of wood, glass, and metal fibres to further improve the structural integrity of the thermal break elongate body. As contemplated in the embodiment depicted in FIGS. 2 to 6 and 8-10, elongate body 210, 310, 410, 510, 610, 810, 910, 1010 is shaped like a rectangular prism. However, in other embodiments, elongate body may be shaped in any suitable form or dimensions.

Elongate body 210, 310, 410, 510, 610, 710, 810, 910, 1010 of the thermal break 200, 300, 400, 500, 600, 700, 800, 900, 1000 may be any suitable dimensions, and the dimensions of elongate body 210, 310, 410, 510, 610, 710, 810, 910, 1000 may depend on the dimensions of the fixture which is to be mounted to fixture-mounting surface 210a, 310a, 410a, 510a, 610a, 710a, 810a, 910a, 1010a of the elongate body 210, 310, 410, 510, 610, 710, 810, 910, 1010 when in use. Preferably, elongate body 210, 310, 410, 510, 610, 710, 810, 910, 1010 is of dimensions such that spalling does not occur. Any suitable number of protrusions may extend from the elongate body of the thermal break. The number of protrusions extending from the elongate body may depend on the dimensions of the elongate body and the optimal spacing of the protrusions to provide good anchorage of the thermal break to the structural wythe and/or fascia wythe of the exterior wall. In other embodiments one or more protrusions extend from any one or both of the contacting surfaces of the thermal break.

Thermal Break Manufacture

Using an expanded closed-cell polyvinyl chloride foam thermal break as an example, polyvinyl chloride and polyurea may be mixed together under controlled conditions, which are known to a person skilled in the art. The mixture is then poured into a mold, and the filled mold is sealed. The sealed mold is then placed into a large press where it is heated. The resulting solid material is removed from the mold, and soaked in a hot bath where the resulting solid material is allowed to expand to its desired final density. The solid material is then cured, and the cured expanded closed-cell polyvinyl chloride foam material is cut into its desired dimensions. As would be known to a person skilled in the art, the mold may dictate the general shape of the thermal break, and may dictate which components of the thermal break are integrally formed together.

Exterior Wall Manufacture Using Thermal Break 200

Using thermal break 200 as an example, thermal break 200 may be incorporated into a "tilt-up" exterior wall in the following manner. Referring to FIGS. 11(a) to 11(d), a pre-defined area is marked by placement of lumber 1100 marking the perimeter of the desired exterior wall. Lumber 1100 is positioned such that inside face-side 1100a faces towards the desired exterior wall and outside face-side 1100b faces away from the desired exterior wall. A supporting piece of lumber 1110 is placed at the base of lumber 1100 and against outside face side 1100b, and lumbers 1100 and 1110 are joined together by one or more fasteners such as a nail, screw, strut, connecting piece of wood, or the like, to maintain the upright position of lumber 1100. The combination of lumber 1100, lumber 1110, and the one or more fasteners joining lumbers 1100 and 1110 together, collectively forms the formwork. Welded wire mesh (not shown) is then laid out within the boundaries of the formwork and over the pre-defined area.

Figure 11A:
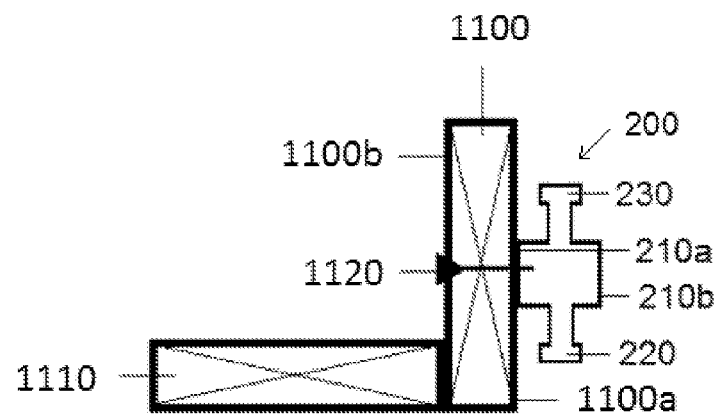
FIGS. 11(a), 11(b), and 11(c) are side views of the thermal break according to FIG. 2(a) coupled to wood formwork in a process for constructing a tilt-up exterior wall.
Figure 11B:
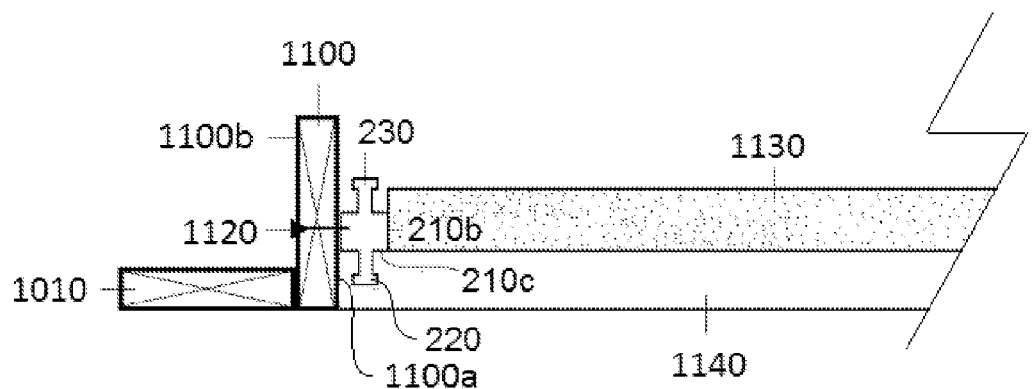
Figure 11C:
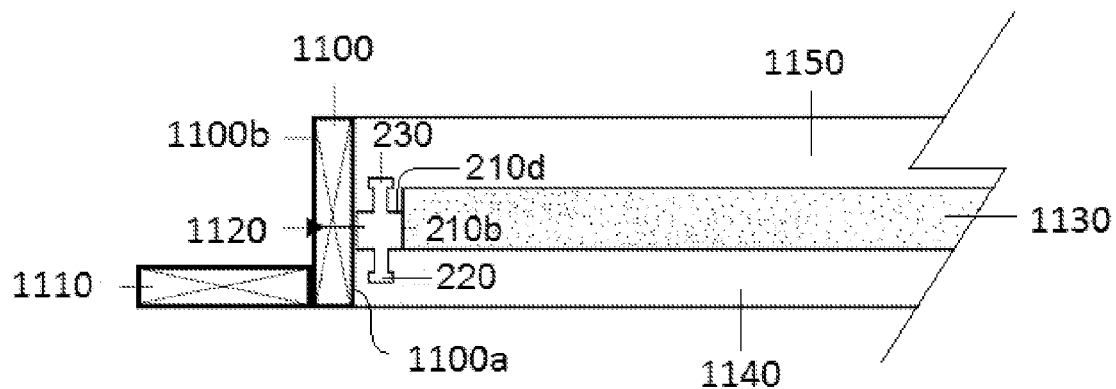
Figure 11D:
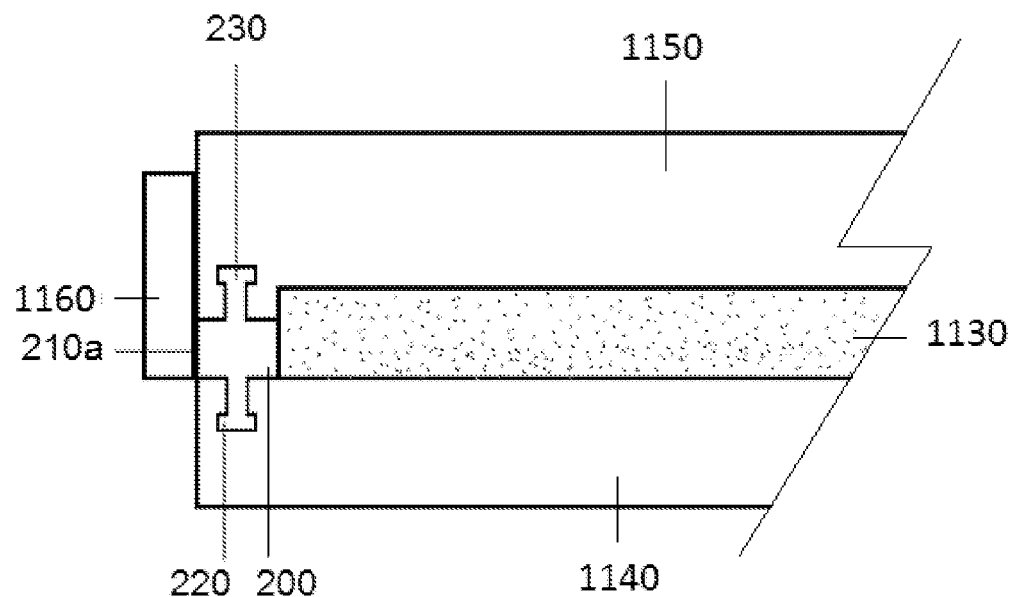
FIG. 11(d) is a top view of the tilt-up exterior wall comprising the thermal break according to FIG. 2(a) with the formwork removed and a fixture mounted to the thermal break and a portion of the structural wythe.

Using a fastener 1120, for example a screw or nail, the thermal break 200 is mounted onto inside face-side 1100a of lumber 1100 with fixture-mounting surface 210a of the elongate body 210 extending along the inside face-side 1100a of lumber 1100. The thermal break 200 may be installed before or after the welded wire mesh is laid out. Referring to FIG. 11(b), a first layer of wet concrete (forming the fascia wythe 1140 of the exterior wall) is poured within the pre-defined area and over the welded wire mesh until the first protrusions 220 of the thermal break 200 are immersed in wet concrete and the wet concrete contacts contacting surface 210c of the elongate body 210. The elongate body 210 of the thermal break 200 is contiguous with the top of the first layer of wet concrete, but not immersed in the first layer of wet concrete. Before the wet concrete sets, insulating material 1130 is positioned over the first layer of wet concrete with the end face of the insulating material 1130 being contiguous with surface 210b of thermal break 200. The insulating material 1130 is coupled with the first layer of wet concrete using methods known in the art. As depicted in FIGS. 11(b) to 11(d), the width of insulating material 1130 is greater than the width of surface 210b of thermal break 200. Alternatively, the width of insulating material 1130 and the width of surface 210b of thermal break 200 are the same. Alternatively, the width of surface 210b of thermal break 200 is greater than the width of insulating material 1130.

Once the first layer of wet concrete has set, thereby forming fascia wythe 1140, reinforcing bars (not shown) are laid out over insulating material 1130 and thermal break 200. Referring to FIG. 11(c), a second layer of wet concrete (forming the structural wythe 1150 of the exterior wall) is then poured over the reinforcing bars, insulating material 1130, and thermal break 200 such that the second protrusions 230 are completely immersed in wet concrete and the wet concrete contacts contacting surface 210d of elongate body 210. The insulating material 1130 is coupled to the second layer of wet concrete using methods known in the art. The second layer of wet concrete sets to form the structural wythe 1150 of the exterior wall.

Fastener 1120 and the formwork (i.e. the combination of lumber 1100, lumber 1110, and the one or more fasteners joining lumbers 1100 and 1110 together) are then removed. Referring to FIG. 11(d), a fixture 1160, for example a door frame, window frame, air venting grill, or other building component, is mounted on fixture-mounting surface 210a of thermal break 200 and on at least a portion of structural wythe 1150. Alternatively, the fixture 1160 may be mounted on fixture-mounting surface 210a of elongate body 210 of thermal break 200 only, and without being mounted to the structural wythe 1150. A crane may be used to tilt the exterior wall with fixture 1160 mounted thereon from a horizontal position to a vertical position and to move the exterior wall to its desired position. Alternatively, the exterior wall may be tilted from a horizontal position to a vertical position and positioned correctly before fixture 1160 is mounted on fixture-mounting surface 210a of thermal break 200.

An exterior wall comprising a thermal break 1000 may be similarly manufactured, except that no protrusions are immersed in the fascia wythe.

Exterior Wall Manufacture Using Thermal Break 700

Using thermal break 700 as depicted in FIG. 7(a) as an example, thermal break 700 may be incorporated into a "tilt-up" exterior wall in the following manner. A formwork is constructed at the boundary of the pre-defined area as discussed above. Welded wire mesh (not shown) is then laid out within the boundaries of the formwork and over the pre-defined area.

Using a fastener, for example a screw or nail, thermal break 700 is mounted onto the inside face-side the first lumber with fixture-mounting surface 710a of elongate body 710 extending along the inside face side of the first lumber. Thermal break 700 may be installed before or after the welded wire mesh is laid out. A first layer of wet concrete (forming the fascia wythe of the exterior wall) is then poured within the pre-defined area and over the welded wire mesh until the wet concrete contacts contacting surface 710c of elongate body 710. Elongate body 710 of thermal break 700 is contiguous with the top of the first layer of wet concrete, but not immersed in the first layer of wet concrete. Before the wet concrete sets, insulating material is positioned over the first layer of wet concrete with the end face of the insulating material being contiguous with surface 710b of thermal break 700. The insulating material is coupled with the first layer of wet concrete using methods known in the art.

Once the first layer of wet concrete has set, thereby forming the fascia wythe, reinforcing bars are laid out over the insulating material and thermal break 700. A second layer of wet concrete is then poured over the reinforcing bars, the insulating material, and thermal break 700 such that the wet concrete contacts contacting surface 710d of elongate body 710. The insulating material is coupled to the second layer of wet concrete using methods known in the art. The second layer of wet concrete sets to form the structural wythe of the exterior wall.

The fastener and the formwork are then removed. A fixture, for example a door frame, window frame, air venting grill, or other building component, is mounted on fixture-mounting surface 710a of thermal break 700 and on at least a portion of the structural wythe. Alternatively, the fixture may be mounted on fixture-mounting surface 710a of thermal break 700 only, and without being mounted to the structural wythe. A crane may be used to tilt the exterior wall with the fixture mounted thereon from a horizontal position to a vertical position and to move the exterior wall to its desired position. Alternatively, the exterior wall may be tilted from a horizontal position to a vertical position and positioned correctly before the fixture is mounted on fixture-mounting surface 710a of thermal break 700.

Exterior Wall Manufacture Using Thermal Break 900

Using thermal break 900 as an example, thermal break 900 may be incorporated into a "tilt-up" exterior wall in the following manner. Referring to FIGS. 12(a) to 12(d), a pre-defined area is marked by placement of lumber 1200 marking the perimeter of the desired exterior wall. Lumber 1200 is positioned such that inside face-side 1200a faces towards the desired exterior wall and outside face-side 1200b faces away from the desired exterior wall. A supporting piece of lumber 1210 is placed at the base of lumber 1200 and against outside face side 1200b, and lumbers 1200 and 1210 are joined together by one or more fasteners such as a nail, screw, strut, connecting piece of wood, or the like, to maintain the upright position of lumber 1200. The combination of lumber 1200, lumber 1210, and the one or more fasteners joining lumbers 1200 and 1210 together, collectively forms the formwork. Welded wire mesh (not shown) is then laid out within the boundaries of the formwork and over the pre-defined area.

Figure 12A:
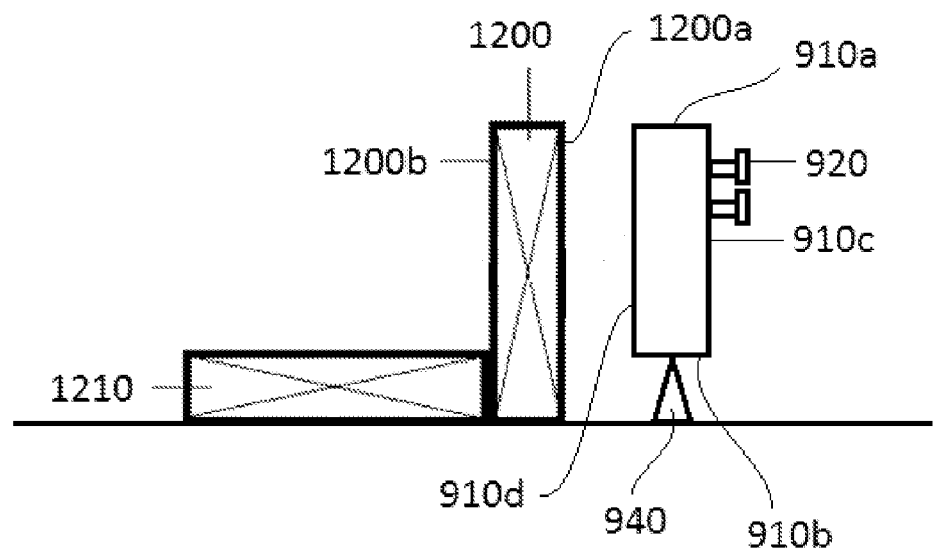
FIGS. 12(a), 12(b), 12(c), and 12(d) are side views of the thermal break according to FIG. 9(a) in a process for constructing a tilt-up exterior wall.
Figure 12B:
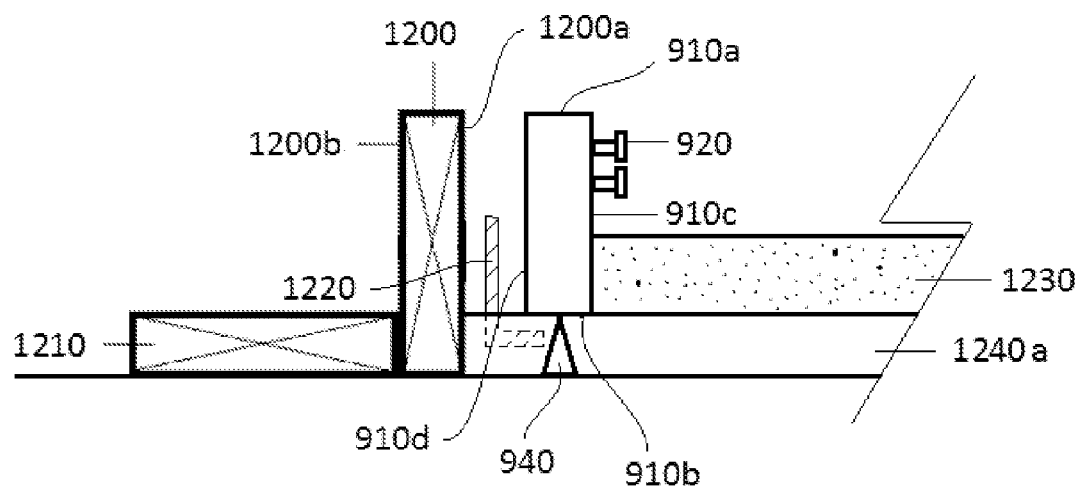

One or more supporting bases 940 extends along the length of surface 910b, the one or more supporting bases 940 supporting the thermal break 900 in mid-air within the boundaries of the formwork. Referring to FIG. 12(b), a first layer of wet concrete 1240a (forming a portion of the fascia wythe 1240 of the exterior wall) is poured within the pre-defined area and over the welded wire mesh until the one or more supporting bases 940 is immersed in wet concrete and the wet concrete layer 1240a contacts contacting surface 910b of the elongate body 910. The elongate body 910 of the thermal break 900 is contiguous with the top of the first layer of wet concrete 1240a, but not immersed in the first layer of wet concrete 1240a. Before the wet concrete layer 1240a sets, insulating material 1230 is positioned over the first layer of wet concrete 1240a with the end face of the insulating material 1230 being contiguous with surface 910c of thermal break 900. The insulating material 1230 is coupled with the first layer of wet concrete 1240a using methods known in the art. As depicted in FIG. 12(b), a reinforcing bar 1220 is immersed in the first layer of wet concrete 1240a, the reinforcing bar 1220 for providing additional stability to the fascia wythe 1240, and particularly the corner of the fascia wythe 1240.

Figure 12C:
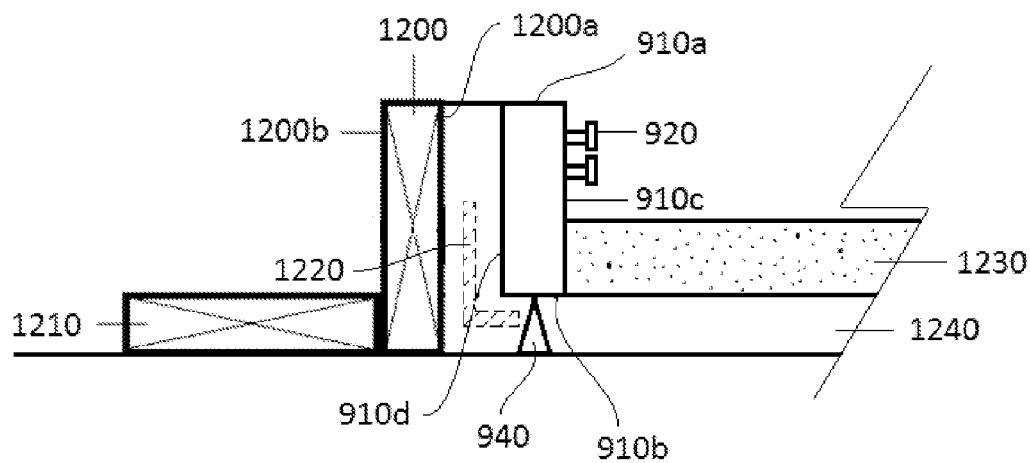

Referring to FIG. 12(c), a second layer of wet concrete (not numbered) is poured between the lumber 1200 and surface 910d of thermal break 900 and onto the first layer of wet concrete 1240a, after the first layer of wet concrete

1240a has set. Upon curing of the second layer of wet concrete and the first layer of wet concrete 1240a, the fascia wythe 1240 (which is reinforced at the corner by reinforcing bar 1220) is formed.

Figure 12D:
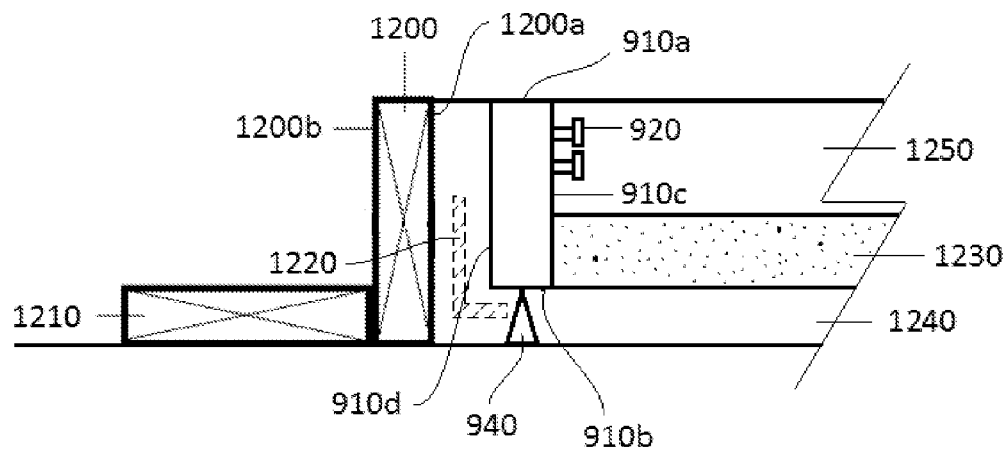
Figure 12E:
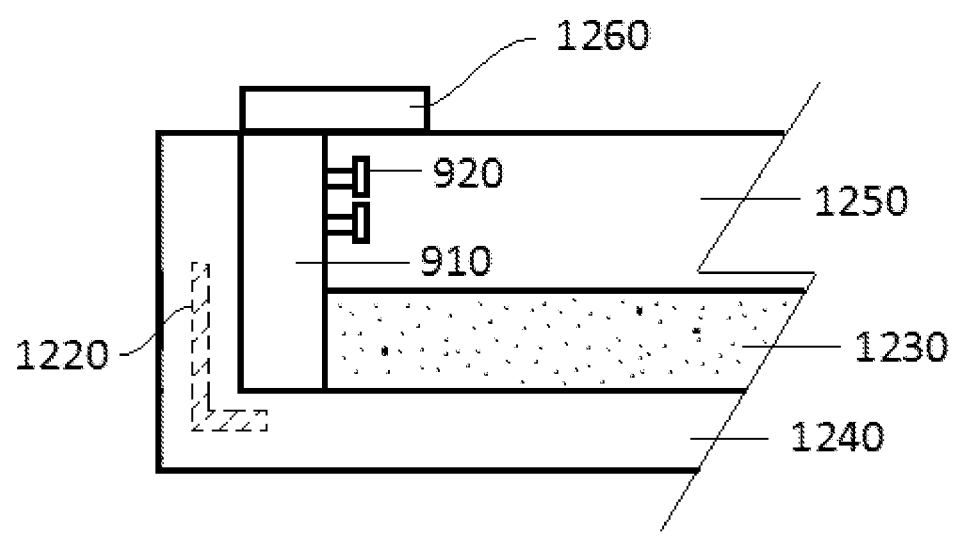
FIG. 12(e) is a top view of the tilt-up exterior wall comprising the thermal break according to FIG. 9(a), with the formwork removed and a fixture mounted to the thermal break and a portion of the structural wythe.

Once the fascia wythe 1240 has formed, reinforcing bars (not shown) are laid out over insulating material 1230. Referring to FIG. 12(d), a third layer of wet concrete is then poured over the reinforcing bars and insulating material 1230 such that the one or more protrusions 920 are immersed in the third layer of wet concrete and the third layer of wet concrete contacts contacting surface 910c of elongate body 910. The insulating material 1230 is coupled to the third layer of wet concrete using methods known in the art. The third layer of wet concrete sets to form the structural wythe 1250 of the exterior wall.

The formwork is then removed, and the exterior wall is then tilted-up. The one or more supporting bases 940 are then removed by methods known in the art, and the remaining spatial voids are filled in with concrete. Referring to FIG. 12(d), a fixture 1260, for example a door frame, window frame, air venting grill, or other building component, is mounted on fixture-mounting surface 910a of thermal break 900 and on at least a portion of structural wythe 1250. Alternatively, the fixture 1260 may be mounted on fixture-mounting surface 910a of elongate body 910 of thermal break 900 only, and without being mounted to the structural wythe 1250.

The thermal break of the disclosed embodiments may beneficially satisfy energy code requirements that require an insulating material or a thermal break to be present between the entire surface of the structural wythe and fascia wythe, and at the same time provide a weight-bearing surface for mounting fixtures such as a door frame, window frame, air venting grill, or other building component. The thermal break disclosed herein is less susceptible to rotting over time and is less susceptible to contraction and expansion as compared to wood.

It is contemplated that any part of any aspect or embodiment discussed in this specification can be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

What is claimed is:

1. An exterior wall for tilt-up construction comprising:
   (a) a fascia wythe of the exterior wall;
   (b) a structural wythe of the exterior wall;
   (c) a layer of insulating material positioned between the fascia wythe and the structural wythe; and
   (d) a thermal break positioned between at least a portion of the fascia wythe and at least a portion of the structural wythe, the thermal break comprising (i) an elongate body comprising one or more thermal insulating materials, a fixture-mounting surface, a surface opposite the fixture-mounting surface, a first contacting surface, and a second contacting surface opposite the first contacting surface, and (ii) one or more protrusions extending away from at least one of the first contacting surface and the second contacting surface, wherein the first contacting surface and the second contacting surface extend between the fixture-mounting surface and the surface opposite the fixture-mounting surface, and wherein the elongate body is substantially made of a non-wood material, wherein the fascia wythe is at least in contact with the first contacting surface, the structural wythe is at least in contact with the second contacting surface, and the fixture-mounting surface of the elongate body is co-planar with an outside edge of the fascia wythe and an outside edge of the structural wythe.

2. The exterior wall of claim 1, wherein: (i) the first contacting surface comprises a first surface portion that extends along a first axis; (ii) the second contacting surface comprises a first surface portion that extends along a second axis; and (iii) the first axis and the second axis converge towards each other.

3. The exterior wall of claim 1, wherein the thermal break has a cross-sectional shape of an isosceles trapezoid.

4. The exterior wall of claim 1, wherein at least one of the one or more protrusions is integrally formed with the elongate body.

5. The exterior wall of claim 1, wherein at least one of the one or more protrusions is a flange.

6. The exterior wall of claim 1, wherein the one or more protrusions are coupled to and extend away from the second contacting surface, and wherein no protrusions extend away from the first contacting surface.

7. The exterior wall of claim 1, wherein the thermal break comprises a plurality of protrusions, the plurality of protrusions comprising: (i) one or more first protrusions coupled to the first contacting surface, wherein the one or more first protrusions extend away from the elongate body; and (ii) one or more second protrusions coupled to the second contacting surface, wherein the one or more second protrusions extend away from the elongate body.

8. The exterior wall of claim 1, wherein at least one of the one or more protrusions comprises an elongate extension and a head, and wherein the elongate extension connects the head to the elongate body and the head has a greater cross sectional area than the elongate extension.

9. The exterior wall of claim 1, wherein at least one of the protrusions comprises a first end and an opposite second end, wherein the first end is coupled to the elongate body and has a smaller cross sectional area than the second end.

10. The exterior wall of claim 1, wherein at least one of the one or more protrusions comprises a first extension extending away from the elongate body along a first axis, a second extension coupled to the first extension and extending away from the first extension along a second axis, wherein the first axis and the second axis intersect and do not overlap.

11. The exterior wall of claim 1, wherein the elongate body comprises a first insulating material surrounded by a second insulating material.

12. The exterior wall of claim 1, wherein at least one of the one or more protrusions is porous.

13. The exterior wall of claim 1, wherein the elongate body is substantially made of a polyvinyl chloride material.

14. The exterior wall of claim 1, wherein the elongate body is substantially made of polyvinyl chloride foam.

15. The exterior wall of claim 1, wherein the elongate body comprises one or more bores that extend through the elongate body between the first and second contacting surfaces, and the one or more protrusions comprise one or more rods, wherein each rod comprises a first end portion and an opposite second end portion with a middle portion extending between the first and second end portions, whereby the middle portion is received within one of the bores and the first end portion comprises a first protrusion and the second end portion comprises a second protrusion.

16. An exterior wall for tilt-up construction comprising:
(a) a fascia wythe of the exterior wall;
(b) a structural wythe of the exterior wall;
(c) a layer of insulating material positioned between the fascia wythe and the structural wythe; and
(d) a thermal break positioned between at least a portion of the fascia wythe and at least a portion of the structural wythe, the thermal break comprising (i) an elongate body comprising one or more thermal insulating materials, a fixture-mounting surface, a surface opposite the fixture-mounting surface, a first contacting surface, and a second contacting surface opposite the first contacting surface, and (ii) one or more protrusions extending away from at least one of the first contacting surface and the second contacting surface, wherein the first contacting surface and the second contacting surface extend between the fixture-mounting surface and the surface opposite the fixture-mounting surface, and wherein the elongate body is substantially made of a non-wood material, wherein:
(i) the fascia wythe is in contact with the surface opposite the fixture-mounting surface and the first contacting surface;
(ii) the layer of insulating material is in contact with a portion of the second contacting surface;
(iii) the structural wythe is in contact with a portion of the first contacting surface and immerses one or more protrusions extending away from the first contacting surface; and
(iv) the fixture-mounting surface is co-planar with an outside edge of the fascia wythe and an outside edge of the structural wythe.

17. The exterior wall of claim 16, wherein: (i) the first contacting surface comprises a first surface portion that extends along a first axis; (ii) the second contacting surface comprises a first surface portion that extends along a second axis; and (iii) the first axis and the second axis converge towards each other.

18. The exterior wall of claim 16, wherein the thermal break has a cross-sectional shape of an isosceles trapezoid.

19. The exterior wall of claim 16, wherein at least one of the one or more protrusions is integrally formed with the elongate body.

20. The exterior wall of claim 16, wherein at least one of the one or more protrusions is a flange.

21. The exterior wall of claim 16, wherein the one or more protrusions are coupled to and extend away from the second contacting surface, and wherein no protrusions extend away from the first contacting surface.

22. The exterior wall of claim 16, wherein the thermal break comprises a plurality of protrusions, the plurality of protrusions comprising: (i) one or more first protrusions coupled to the first contacting surface, wherein the one or more first protrusions extend away from the elongate body; and (ii) one or more second protrusions coupled to the second contacting surface, wherein the one or more second protrusions extend away from the elongate body.

23. The exterior wall of claim 16, wherein at least one of the one or more protrusions comprises an elongate extension and a head, and wherein the elongate extension connects the head to the elongate body and the head has a greater cross sectional area than the elongate extension.

24. The exterior wall of claim 16, wherein at least one of the protrusions comprises a first end and an opposite second end, wherein the first end is coupled to the elongate body and has a smaller cross sectional area than the second end.

25. The exterior wall of claim 16, wherein at least one of the one or more protrusions comprises a first extension extending away from the elongate body along a first axis, a second extension coupled to the first extension and extending away from the first extension along a second axis, wherein the first axis and the second axis intersect and do not overlap.

26. The exterior wall of claim 16, wherein the elongate body comprises a first insulating material surrounded by a second insulating material.

27. The exterior wall of claim 16, wherein at least one of the one or more protrusions is porous.

28. The exterior wall of claim 16, wherein the elongate body is substantially made of a polyvinyl chloride material.

29. The exterior wall of claim 16, wherein the elongate body is substantially made of polyvinyl chloride foam.

30. The exterior wall of claim 16, wherein the elongate body comprises one or more bores that extend through the elongate body between the first and second contacting surfaces, and the one or more protrusions comprise one or more rods, wherein each rod comprises a first end portion and an opposite second end portion with a middle portion extending between the first and second end portions, whereby the middle portion is received within one of the bores and the first end portion comprises a first protrusion and the second end portion comprises a second protrusion.

31. A method of constructing an exterior wall comprising a thermal break positioned between a fascia wythe and a structural wythe, the thermal break comprising (i) an elongate body comprising one or more thermal insulating materials, a fixture-mounting surface, a surface opposite the fixture-mounting surface, a first contacting surface, and a second contacting surface opposite the first contacting surface, and (ii) one or more protrusions extending away from at least one of the first contacting surface and the second contacting surface, wherein the first contacting surface and the second contacting surface extend between the fixture-mounting surface and the surface opposite the fixture-mounting surface, and wherein the elongate body is substantially made of a non-wood material, the method comprising the steps of:
(a) mounting the fixture-mounting surface of the elongate body of the thermal break to a formwork that forms a perimeter around an area;
(b) pouring a first layer of wet concrete within the area such that the first layer of wet concrete contacts at least the first contacting surface;
(c) positioning an insulating material adjacent the surface opposite the fixture-mounting surface and over the first layer of wet concrete;
(d) allowing the first layer of wet concrete to set and form the fascia wythe of the exterior wall;
(e) pouring a second layer of wet concrete over the insulating material and the thermal break within the area such that the second layer of wet concrete contacts at least the second contacting surface; and
(f) allowing the second layer of wet concrete to set and form the structural wythe of the exterior wall.

32. A method of constructing an exterior wall comprising a thermal break positioned between a fascia wythe and a structural wythe, the thermal break comprising (i) an elongate body comprising one or more thermal insulating materials, a fixture-mounting surface, a surface opposite the fixture-mounting surface, a first contacting surface, and a second contacting surface opposite the first contacting surface, and (ii) one or more protrusions extending away from at least one of the first contacting surface and the second contacting surface, wherein the first contacting surface and the second contacting surface extend between the fixture-mounting surface and the surface opposite the fixture-mounting surface, and wherein the elongate body is substantially made of a non-wood material, the method comprising the steps of:
- (a) providing a formwork that forms a perimeter around an area;
- (b) supporting the thermal break within the area on one or more supporting bases, wherein the one or more supporting bases is in contact with the surface that is opposite the fixture-mounting surface;
- (c) positioning the thermal break in the area, such that a space is provided between the first contacting surface of the thermal break and the formwork;
- (d) pouring a first layer of wet concrete within the area such that the first layer of wet concrete contacts at least the surface opposite the fixture-mounting surface;
- (e) positioning an insulating material over the first layer of wet concrete and in contact with a portion of the second contacting surface;
- (f) allowing the first layer of wet concrete to set;
- (g) pouring a second layer of wet concrete in between the formwork and the first contacting surface of the thermal break such that the second layer of wet concrete contacts the formwork and the first contacting surface;
- (h) allowing the second layer of wet concrete to set;
- (i) pouring a third layer of wet concrete over the insulating material such that the third layer of wet concrete contacts the second contacting surface and immerses one or more protrusions extending away from the second contacting surface; and
- (j) allowing the third layer of wet concrete to set and form the structural wythe of the exterior wall.

* * * * *